United States Patent
Tagawa et al.

(10) Patent No.: US 9,645,969 B2
(45) Date of Patent: May 9, 2017

(54) INFORMATION SYSTEM FOR AUTOMOTIVE, ON-VEHICLE DEVICE AND SERVER DEVICE

(71) Applicant: Clarion Co., Ltd., Saitama-shi, Saitama (JP)

(72) Inventors: Shinya Tagawa, Saitama (JP); Keisuke Mutou, Tokyo (JP); Mika Sugimoto, Yokohama (JP)

(73) Assignee: Clarion Co., Ltd., Saitama-shi (JP)

( * ) Notice: Subject to any disclaimer, the term of this patent is extended or adjusted under 35 U.S.C. 154(b) by 222 days.

(21) Appl. No.: 13/730,683

(22) Filed: Dec. 28, 2012

(65) Prior Publication Data

US 2013/0173084 A1 Jul. 4, 2013

(30) Foreign Application Priority Data

Dec. 29, 2011 (JP) ................................. 2011-290347

(51) Int. Cl.
*G06F 17/00* (2006.01)
*G07C 5/00* (2006.01)
(Continued)

(52) U.S. Cl.
CPC ............. *G06F 17/00* (2013.01); *G07C 5/008* (2013.01); *G01C 21/3469* (2013.01); *G07C 5/085* (2013.01)

(58) Field of Classification Search
CPC . B60W 40/072; G01C 21/32; G01C 21/3469; Y02B 60/42; G06F 17/00; G09B 29/007; B60L 7/18; B60L 11/1803
(Continued)

(56) References Cited

U.S. PATENT DOCUMENTS 6,633,814 B2 * 10/2003 Kohli et al. ................... 701/466
8,290,695 B2 * 10/2012 Hiestermann et al. ........ 701/119
(Continued)

FOREIGN PATENT DOCUMENTS

EP 2 306 153 A2 4/2011
JP 2005-149358 A 6/2005
(Continued)

OTHER PUBLICATIONS

European Search Report dated Oct. 31, 2016 (Eighteen (18) pages).

*Primary Examiner* — Adam Tissot
*Assistant Examiner* — Aaron Smith
(74) *Attorney, Agent, or Firm* — Crowell & Moring LLP

(57) ABSTRACT

An information system for automotive includes a plurality of on-vehicle devices each installed in a vehicle and a server device connected with the on-vehicle devices via a communication network. The plurality of on-vehicle devices each include an acceleration/deceleration change detection unit that detects an acceleration/deceleration change of the vehicle equipped with the on-vehicle device and a transmission unit that transmits acceleration/deceleration information pertaining to the detected acceleration/deceleration change. The server device includes a reception unit that receives the acceleration/deceleration information, a statistical parameter calculating unit that calculates statistical parameters to be used to estimate an extent of energy consumption or energy regeneration based upon the received acceleration/deceleration information, and an estimating unit for estimating the extent of energy consumption or energy regeneration based upon the calculated statistical parameters.

5 Claims, 11 Drawing Sheets

(51) Int. Cl.
*G07C 5/08* (2006.01)
*G01C 21/34* (2006.01)

(58) Field of Classification Search
USPC .............................. 701/119, 123; 340/995.1
See application file for complete search history.

(56) References Cited

U.S. PATENT DOCUMENTS

| | | | |
|---|---|---|---|
| 8,694,232 B2* | 4/2014 | Kono et al. .................... | 701/123 |
| 2007/0021909 A1* | 1/2007 | Matsuda ....................... | 701/208 |
| 2007/0112475 A1 | 5/2007 | Koebler et al. | |
| 2009/0070035 A1* | 3/2009 | Van Buer ............... | G01C 21/32 |
| | | | 701/450 |
| 2010/0114473 A1* | 5/2010 | Kono et al. .................... | 701/200 |
| 2011/0060495 A1* | 3/2011 | Kono et al. ...................... | 701/33 |
| 2011/0208428 A1* | 8/2011 | Matsubara et al. ........... | 701/208 |
| 2011/0241905 A1* | 10/2011 | Niwa ......................... | 340/995.1 |

FOREIGN PATENT DOCUMENTS

| | | |
|---|---|---|
| JP | 2010-39674 A | 2/2010 |
| JP | 2010-52652 A | 3/2010 |
| JP | 2010-107459 A | 5/2010 |
| JP | 2010-122117 A | 6/2010 |
| TW | 201031893 A1 | 9/2010 |

\* cited by examiner

FIG.8

| LINK ID | LOSS ACCELE-RATION RATE ($m^2/s^2$) | RE-GENERATION ACCELE-RATION RATE ($m^2/s^2$) | LOSS SEGMENT HORIZONTAL DISTANCE (m) | RE-GENERATION SEGMENT HORIZONTAL DISTANCE (m) | LOSS SEGMENT TRAVELING DISTANCE (m) | RE-GENERATION SEGMENT TRAVELING DISTANCE (m) | LOSS SEGMENT UP ALTITUDE DIFFERENCE (cm) | RE-GENERATION SEGMENT UP ALTITUDE DIFFERENCE (cm) | LOSS SEGMENT DOWN ALTITUDE DIFFERENCE (cm) | RE-GENERATION SEGMENT DOWN ALTITUDE DIFFERENCE (cm) |
|---|---|---|---|---|---|---|---|---|---|---|
| n | $V_{l,n}(1)$ | $V_{r,n}(1)$ | $L_{2Dl,n}(1)$ | $L_{2Dr,n}(1)$ | $L_{3Dl,n}(1)$ | $L_{3Dr,n}(1)$ | $H_{Ul,n}(1)$ | $H_{Ur,n}(1)$ | $H_{Dl,n}(1)$ | $H_{Dr,n}(1)$ |

FIG.9

| LINK ID | LOSS ACCELE-RATION RATE (m/s²) | RE-GENERATION ACCELE-RATION RATE (m/s²) | LOSS SEGMENT HORIZONTAL DISTANCE (m) | RE-GENERATION SEGMENT HORIZONTAL DISTANCE (m) | LOSS SEGMENT TRAVELING DISTANCE (m) | RE-GENERATION SEGMENT TRAVELING DISTANCE (m) | LOSS SEGMENT UP ALTITUDE DIFFERENCE (cm) | RE-GENERATION SEGMENT UP ALTITUDE DIFFERENCE (cm) | LOSS SEGMENT DOWN ALTITUDE DIFFERENCE (cm) | RE-GENERATION SEGMENT DOWN ALTITUDE DIFFERENCE (cm) |
|---|---|---|---|---|---|---|---|---|---|---|
| n | $v_{l,n}(1)$ | $v_{r,n}(1)$ | $L_{2Dl,n}(1)$ | $L_{2Dr,n}(1)$ | $L_{3Dl,n}(1)$ | $L_{3Dr,n}(1)$ | $H_{Ul,n}(1)$ | $H_{Ur,n}(1)$ | $H_{Dl,n}(1)$ | $H_{Dr,n}(1)$ |
|   | $v_{l,n}(2)$ | $v_{r,n}(2)$ | $L_{2Dl,n}(2)$ | $L_{2Dr,n}(2)$ | $L_{3Dl,n}(2)$ | $L_{3Dr,n}(2)$ | $H_{Ul,n}(2)$ | $H_{Ur,n}(2)$ | $H_{Dl,n}(2)$ | $H_{Dr,n}(2)$ |
|   | $v_{l,n}(3)$ | $v_{r,n}(3)$ | $L_{2Dl,n}(3)$ | $L_{2Dr,n}(3)$ | $L_{3Dl,n}(3)$ | $L_{3Dr,n}(3)$ | $H_{Ul,n}(3)$ | $H_{Ur,n}(3)$ | $H_{Dl,n}(3)$ | $H_{Dr,n}(3)$ |
|   | $v_{l,n}(4)$ | $v_{r,n}(4)$ | $L_{2Dl,n}(4)$ | $L_{2Dr,n}(4)$ | $L_{3Dl,n}(4)$ | $L_{3Dr,n}(4)$ | $H_{Ul,n}(4)$ | $H_{Ur,n}(4)$ | $H_{Dl,n}(4)$ | $H_{Dr,n}(4)$ |
|   | $v_{l,n}$ | $v_{r,n}$ | $L_{2Dl,n}$ | $L_{2Dr,n}$ | $L_{3Dl,n}$ | $L_{3Dr,n}$ | $H_{Ul,n}$ | $H_{Ur,n}$ | $H_{Dl,n}$ | $H_{Dr,n}$ |

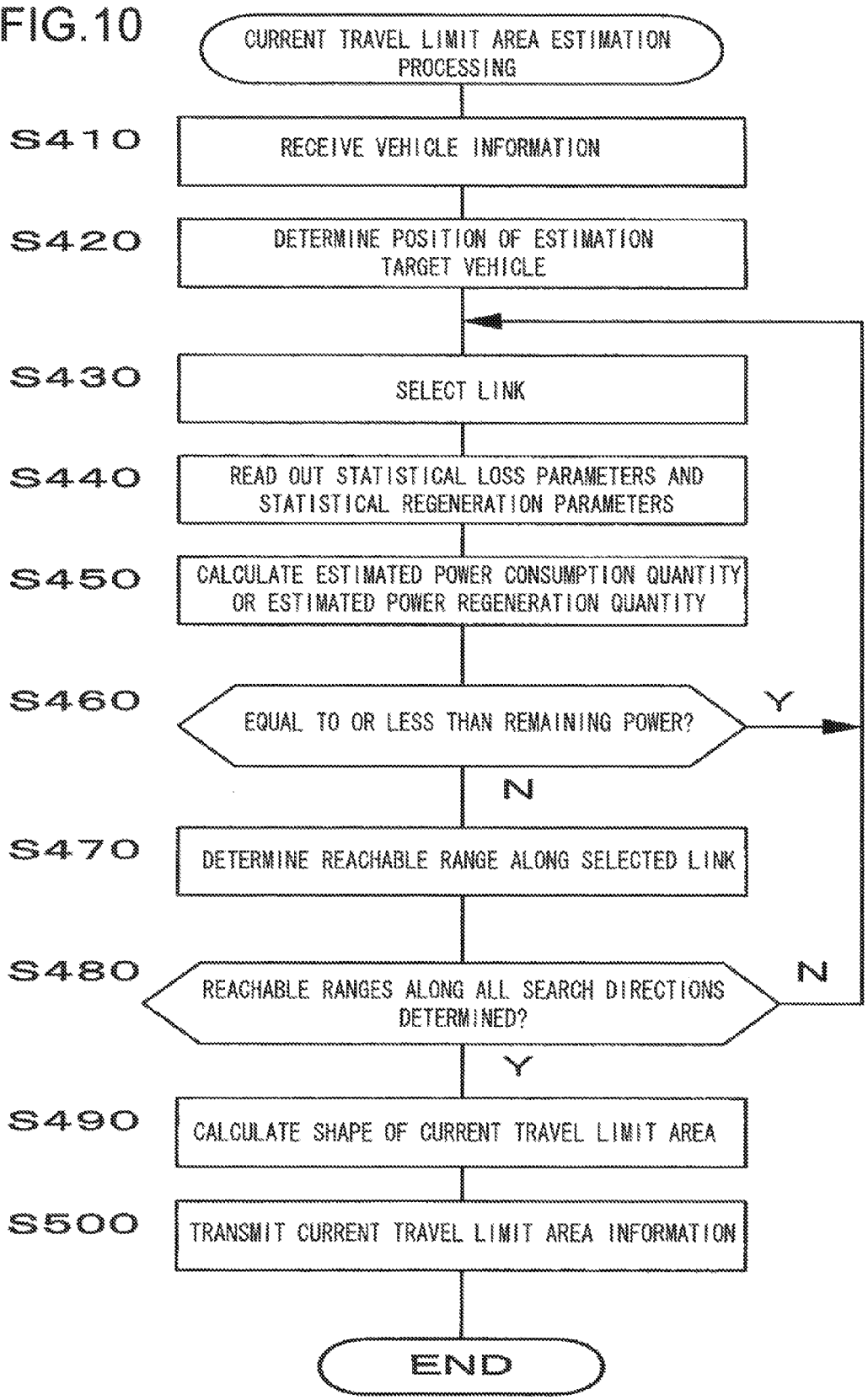

INFORMATION SYSTEM FOR AUTOMOTIVE, ON-VEHICLE DEVICE AND SERVER DEVICE

INCORPORATION BY REFERENCE

The disclosure of the following priority application is herein incorporated by reference: Japanese Patent Application No. 2011-290347 filed on Dec. 29, 2011.

BACKGROUND OF THE INVENTION

1. Field of the Invention

The present invention relates to an information system for automotive and also relates to an on-vehicle device and a server device utilized in this information system.

2. Description of Related Art

A car navigation device known in the related art estimates the level of energy consumption necessitated as the vehicle travels by estimating a vehicle travel pattern and predicting the fuel consumption in correspondence to each road link based upon the estimated travel pattern and searches for the route requiring the least fuel consumption (see Japanese Laid Open Patent Publication No. 2010-107459).

The car navigation device in the related art cited above estimates the extent of acceleration loss based upon a travel pattern that repeats acceleration/deceleration at a fixed acceleration/deceleration rate G, and estimates the fuel consumption corresponding to each road link in conjunction with this acceleration loss. However, in reality, the vehicle does not always travel in an environment in which it accelerates and decelerates with such a simple travel pattern. For this reason, it is difficult to accurately estimate the level of fuel consumption.

An object of the present invention, having been completed by addressing the issues in the related art discussed above, is to accurately predict the level of energy consumption required for vehicle travel.

SUMMARY OF THE INVENTION

An information system for automotive according to a first aspect of the present invention includes a plurality of on-vehicle devices each installed in a vehicle and a server device connected with the on-vehicle devices via a communication network. In this information system, the plurality of on-vehicle devices each include: an acceleration/deceleration change detection means for detecting an acceleration/deceleration change of the vehicle equipped with the on-vehicle device; and a transmission means for transmitting acceleration/deceleration information pertaining to the acceleration/deceleration change detected by the acceleration/deceleration change detection means, and the server device includes: a reception means for receiving the acceleration/deceleration information transmitted from each of the plurality of on-vehicle devices; a statistical parameter calculating means for calculating, based upon the acceleration/deceleration information received by the reception means, statistical parameters to be used to estimate an extent of energy consumption or energy regeneration in correspondence to each link among links individually set in correspondence to specific road segments; and an estimating means for estimating, based upon the statistical parameters calculated for each link by the statistical parameter calculating means, the extent of energy consumption or energy regeneration expected to occur at an estimation target vehicle as the estimation target vehicle travels on a planned travel route.

According to a second aspect of the present invention, in the information system for automotive of the first aspect, it is preferred that the acceleration/deceleration change detection means detects the acceleration/deceleration change when the vehicle has shifted from an accelerating state to a decelerating state or from a decelerating state to an accelerating state.

According to a third aspect of the present invention, in the information system for automotive of the first or second aspect, it is preferred that the acceleration/deceleration change detection means detects the acceleration/deceleration change when an extent of the acceleration/deceleration change is equal to or greater than a predetermined value.

According to a fourth aspect of the present invention, in the information system for automotive of any one of the first through third aspects, when, while taking a position of the vehicle at a time when the acceleration/deceleration change was most recently detected as an origin point, an actual cumulative traveling distance of the vehicle from the origin point satisfies a predetermined condition, the acceleration/deceleration change detection means may detect an equivalent point to be regarded as equivalent to the acceleration/deceleration change.

According to a fifth aspect of the present invention, in the information system for automotive of the fourth aspect, it is preferred that the acceleration/deceleration change detection means detects the equivalent point when a difference between a hypothetical cumulative traveling distance calculated by assuming that the vehicle, having departed the origin point, has continued to travel at a constant acceleration/deceleration rate and the actual cumulative traveling distance is equal to or greater than a predetermined value.

According to a sixth aspect of the present invention, in the information system for automotive of any one of the first through fifth aspect, the plurality of on-vehicle devices may each further include a change ratio altering means for altering, in correspondence to a number of times the acceleration/deceleration change detection means has detected the acceleration/deceleration change during a predetermined length of time, a change ratio set in advance for the acceleration/deceleration in order to prohibit detection by the acceleration/deceleration change detection means.

According to a seventh aspect of the present invention, in the information system for automotive of any one of the first through sixth aspect, it is preferred that the transmission means transmits information indicating a speed or an acceleration/deceleration rate of the vehicle, a time point and a position of the vehicle, all measured when the acceleration/deceleration change detection means detects the acceleration/deceleration change, to the server device as the acceleration/deceleration information.

According to an eighth aspect of the present invention, in the information system for automotive of any one of the first through fifth aspect, it is preferred that the statistical parameter calculating means calculates, in correspondence to each link, the statistical parameters that include a statistical loss parameter corresponding to a loss segment, in which energy loss occurs in the vehicle traveling through the segment, and a statistical regeneration parameter corresponding to a regeneration segment, in which energy regeneration occurs in the vehicle traveling through the segment.

According to a ninth aspect of the present invention, in the information system for automotive of any one of the first through eighth aspect, the server device may further includes: an ascertaining means for ascertaining remaining energy available in the estimation target vehicle; a current travel limit area specifying means for defining a specific current travel limit area on a map for the estimation target vehicle based upon the remaining energy ascertained by the ascertaining means and the extent of energy consumption or energy regeneration estimated for the estimation target vehicle by the estimating means; and a shape information output means for outputting information pertaining to a shape of the current travel limit area defined by the current travel limit area specifying means.

An on-vehicle device according to a tenth aspect of the present invention installed in a vehicle includes: an acceleration/deceleration change detection means for detecting an acceleration/deceleration change of the vehicle; and a transmission means for transmitting acceleration/deceleration information pertaining to the acceleration/deceleration change detected by the acceleration/deceleration change detection means.

According to an eleventh aspect of the present invention, in the on-vehicle device of the tenth aspect, it is preferred that the acceleration/deceleration change detection means detects the acceleration/deceleration change when the vehicle has shifted from an accelerating state to a decelerating state or from a decelerating state to an accelerating state.

According to a twelfth aspect of the present invention, in the on-vehicle device of the tenth or eleventh aspect, it is preferred that the acceleration/deceleration change detection means detects the acceleration/deceleration change when an extent of the acceleration/deceleration change is equal to or greater than a predetermined value.

According to a thirteenth aspect of the present invention, in the on-vehicle device of any one of the tenth through twelfth aspects, when, while taking a position of the vehicle at a time when the acceleration/deceleration change was most recently detected as an origin point, an actual cumulative traveling distance of the vehicle from the origin point satisfies a predetermined condition, the acceleration/deceleration change detection means may detect an equivalent point to be regarded as equivalent to the acceleration/deceleration change.

According to a fourteenth aspect of the present invention, in the on-vehicle device of the thirteenth aspect, it is preferred that the acceleration/deceleration change detection means detects the equivalent point when a difference between a hypothetical cumulative traveling distance calculated by assuming that the vehicle, having departed the origin point, has continued to travel at a constant acceleration/deceleration rate and the actual cumulative traveling distance is equal to or greater than a predetermined value.

According to a fifteenth aspect of the present invention, the on-vehicle device of any one of the tenth through fourteenth aspects may further include a change ratio altering means for altering, in correspondence to a number of times the acceleration/deceleration change detection means has detected the acceleration/deceleration change during a predetermined length of time, a change ratio set in advance for the acceleration/deceleration in order to prohibit detection by the acceleration/deceleration change detection means.

According to a sixteenth aspect of the present invention, in the on-vehicle device of any one of the tenth through fifteenth aspects, it is preferred that the transmission means transmits information indicating a speed or an acceleration/deceleration rate of the vehicle, a time point and a position of the vehicle, all measured when the acceleration/deceleration change detection means detects the acceleration/deceleration change, to the server device as the acceleration/deceleration information.

An on-vehicle device according to a seventeenth aspect of the present invention installed in a vehicle includes: an acceleration/deceleration change detection means for detecting an acceleration/deceleration change of the vehicle; a statistical parameter calculating means for calculating, based upon history of acceleration/deceleration changes detected by the acceleration/deceleration change detection means, statistical parameters to be used to estimate an extent of energy consumption or energy regeneration in correspondence to each link among the links individually set in correspondence to specific road segments; and an estimating means for estimating, based upon the statistical parameters calculated for each link by the statistical parameter calculating means, the extent of energy consumption or energy regeneration expected to occur at the vehicle as the vehicle travels on a planned travel route.

A server device according to an eighteenth aspect of the present invention includes: a reception means for receiving acceleration/deceleration information transmitted from each vehicle among a plurality of vehicles, pertaining to an acceleration/deceleration change of the vehicle; a statistical parameter calculating means for calculating, based upon the acceleration/deceleration information received by the reception means, statistical parameters to be used to estimate an extent of energy consumption or energy regeneration in correspondence to each link among links individually set in correspondence to specific road segments; and an estimating means for estimating, based upon the statistical parameters calculated for each link by the statistical parameter calculating means, the extent of energy consumption or energy regeneration expected to occur at an estimation target vehicle as the estimation target vehicle travels on a planned travel route.

According to a nineteenth aspect of the present invention, in the server device of the eighteenth aspect, it is preferred that the statistical parameter calculating means calculates, in correspondence to each link, the statistical parameters that include a statistical loss parameter corresponding to a loss segment, in which energy loss occurs in the vehicle traveling through the segment, and a statistical regeneration parameter corresponding to a regeneration segment, in which energy regeneration occurs in the vehicle traveling through the segment.

According to a twentieth aspect of the present invention, the server device of the eighteenth or nineteenth aspect may further include: an ascertaining means for ascertaining remaining energy available in the estimation target vehicle; a current travel limit area specifying means for defining a specific current travel limit area on a map for the estimation target vehicle based upon the remaining energy ascertained by the ascertaining means and the extent of energy consumption or energy regeneration estimated for the estimation target vehicle by the estimating means; and a shape information output means for outputting information pertaining to a shape of the current travel limit area defined by the current travel limit area specifying means.

According to the present invention, the level of energy consumption required for vehicle travel can be predicted accurately.

BRIEF DESCRIPTION OF THE DRAWINGS

FIG. 8 presents examples of loss/regeneration parameters.

FIG. 9 illustrates how statistical parameters are calculated.

FIG. 10 presents a flowchart of the current travel limit area estimation processing.

DESCRIPTION OF PREFERRED EMBODIMENT

Figure 1:
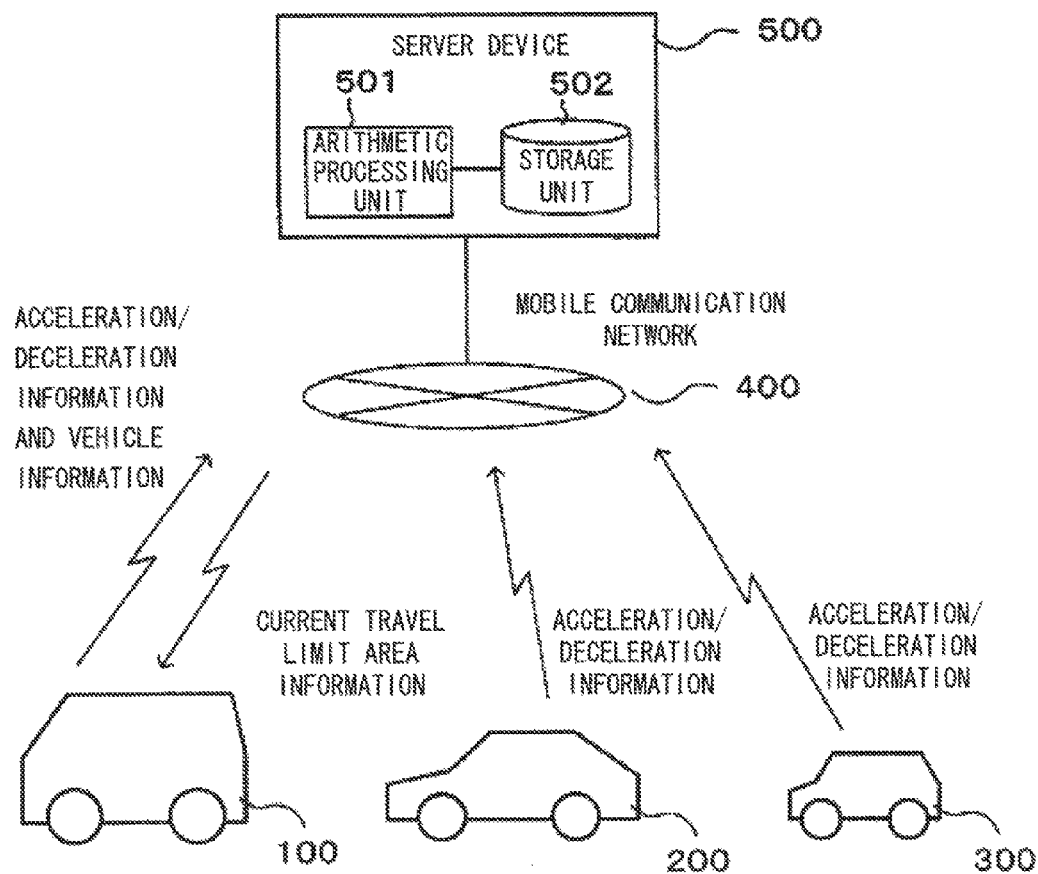
FIG. 1 is a diagram showing the configuration of an information system for automotive achieved in an embodiment of the present invention.

FIG. 1 shows the configuration of an information system for automotive achieved in an embodiment of the present invention. This information system is configured by connecting vehicles 100, 200 and 300 with a server device 500 via a mobile communication network 400. The vehicles 100, 200 and 300 are all electric vehicles (EV) driven by electric energy stored in batteries.

The vehicles 100, 200 and 300 each transmit, via the mobile communication network 400, acceleration/deceleration information pertaining to changes occurring in the acceleration rate or the deceleration rate detected as the particular vehicle travels, to the server device 500. It is to be noted that in the following description, the term "acceleration/deceleration" is used to refer to both acceleration and deceleration. In addition, the vehicles 100, 200 and 300 are each able to issue a request to the server device 500, asking for current travel limit area information corresponding to the remaining power available in the particular vehicle, by transmitting vehicle information indicating the remaining power and the like to the server device 500. While FIG. 1 shows the vehicle 100 transmitting vehicle information to the server device 500 and then receiving current travel limit area information transmitted from the server device 500 in response, similar information exchange also occurs between the server device 500 and the other vehicles 200 and 300.

The server device 500 includes an arithmetic processing unit 501 and a storage unit 502. The arithmetic processing unit 501 receives the acceleration/deceleration information individually transmitted via the mobile communication network 400 from the vehicles 100, 200 and 300 and executes arithmetic processing based upon the contents of the acceleration/deceleration information. In addition, it executes arithmetic processing based upon the vehicle information transmitted from a specific vehicle (the vehicle 100 in the example presented in FIG. 1), so as to estimate a current travel limit area for the particular vehicle and transmits current travel limit information corresponding to the arithmetic processing results to the vehicle via the mobile communication network 400. Such arithmetic processing executed by the arithmetic processing unit 501 will be described in specific detail later.

In the storage unit 502, various types of data needed in the arithmetic processing executed by the arithmetic processing unit 501, data pertaining to the arithmetic processing results provided by the arithmetic processing unit 501 and the like are held in storage. Under control executed by the arithmetic processing unit 501, these data are read out from the storage unit 502 or written into the storage unit 502 as needed.

It is to be noted that while the information system for automotive in FIG. 1 adopts a configuration in which the vehicles 100, 200 and 300 are connected to the server device 500 via the mobile communication network 400, the number of vehicles included in the information system for automotive according to the present invention is not limited to this example. Rather, it is desirable to configure the information system for automotive according to the present invention by connecting a greater number of vehicles than that shown in FIG. 1 to the server device 500 in actual application.

Figure 2:
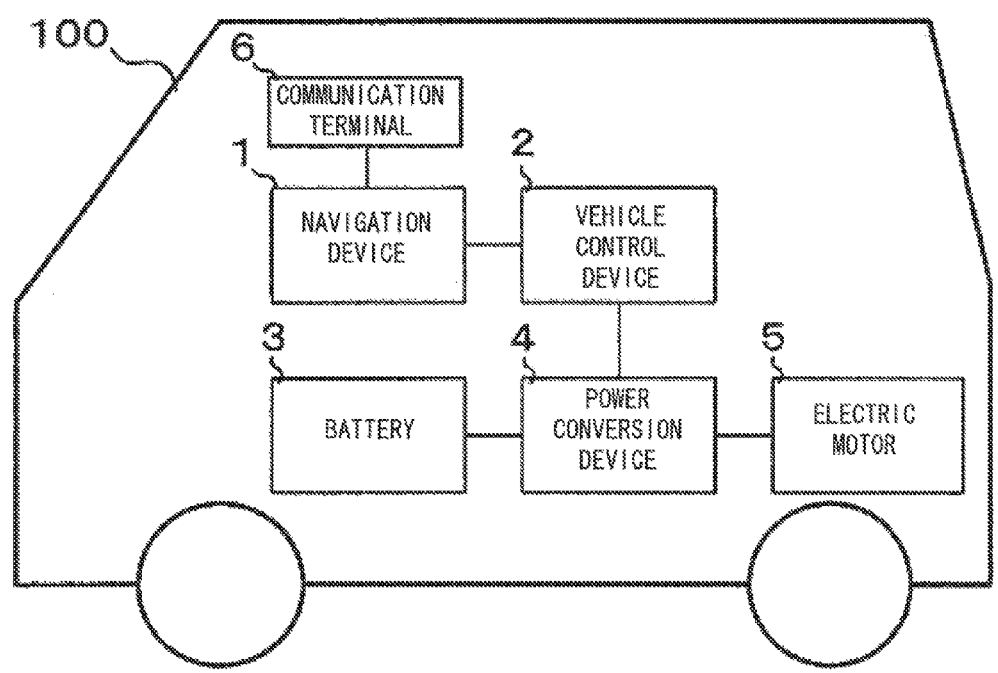
FIG. 2 shows the structure of an on-vehicle system.

FIG. 2 is a block diagram showing the structure of an on-vehicle system included in the information system for automotive shown in FIG. 1. FIG. 2 shows that a navigation device 1, a vehicle control device 2, a battery 3, a power conversion device 4, an electric motor 5 and a communication terminal 6 are installed in the vehicle 100.

The battery 3 provides electric power used to drive the electric motor 5. The vehicle 100 is able to travel as the electric motor 5 is driven with the electric power provided from the battery 3. In addition, when the vehicle 100 is in a decelerating state, the electric motor 5 functions as a generator and generates electric power through regenerative power generation. The electric power obtained through the regenerative power generation is stored in the battery 3. The power conversion device 4 converts the different types of electric power exchanged between the battery 3 and the electric motor 5 so that a given type of power is altered to a state usable by the recipient. In more specific terms, the power conversion device 4 converts DC power provided from the battery 3 to AC power and outputs the AC power resulting from the conversion to the electric motor 5, whereas it converts AC power resulting from regenerative power generation at the electric motor 5 to DC power and outputs the DC power resulting from the conversion to the battery 3.

The vehicle control device 2 monitors the traveling conditions of the vehicle 100, the state of the battery 3, the state of the electric motor 5 and the like, and controls the operation of the power conversion device 4 based upon the monitoring results. As the power conversion device 4 is engaged in operation under the control executed by the vehicle control device 2, optimal power exchange between the battery 3 and the electric motor 5 takes place in correspondence to the traveling conditions of the vehicle 100. Through this process, the kinetic energy required to move the vehicle 100 can be generated at the electric motor 5 by using the electric energy stored in the battery 3. In addition, electric energy in the form of reusable regenerated energy can be stored in the battery 3 by collecting at least part of the kinetic energy of the moving vehicle 100 via the electric motor 5.

The navigation device 1 has a navigation function that allows it to display a map based upon map data and guides the vehicle 100 to a selected destination via a recommended route determined through a route search. It has an additional function that allows it to act as an on-vehicle device in the information system for automotive shown in FIG. 1. In other words, the navigation device 1 is able to transmit the acceleration/deceleration information obtained by detecting changes in the acceleration/deceleration occurring in the vehicle 100 to the server device 500 and issue a request to the server device 500 for current travel limit area information by transmitting vehicle information pertaining to the vehicle 100. The processing executed by the navigation device 1 will be explained later in specific detail.

It is to be noted that the navigation device 1 obtains, as necessary, remaining battery power information indicating the currently available power, i.e., the quantity of electric energy currently stored in the battery 3 in the vehicle 100, which is to be included in the vehicle information to be transmitted to the server device 500, from the vehicle control device 2. The available power may be indicated by the SOC (state of charge) which takes a value between 0%, representing the fully discharged state, through 100%, representing the fully charged state.

Under control executed by the navigation device 1, the communication terminal 6 is engaged in wireless communication with the mobile communication network 4 shown in FIG. 1. The server device 500 is connected to the mobile communication network 4, as illustrated in FIG. 1. Namely, the navigation device 1, connected with the server device 500 via the communication terminal 6 and the mobile communication network 400, is able to transmit the acceleration/deceleration information and the vehicle information to the server device 500 and receive the current travel limit area information from the server device 500.

It is to be noted that while FIG. 2 shows the structure of the on-vehicle system installed in the vehicle 100 as an example, on-vehicle systems adopting structures similar to that shown in FIG. 2 are also installed in the vehicles 200 and 300. In other words, each vehicle is equipped with an on-vehicle system such as that shown in FIG. 2. The acceleration/deceleration information and the vehicle information are transmitted from the navigation device 1 in each vehicle to the server device 500 and the current travel limit area information transmitted from the server device 500 is received at the navigation device 1 installed in each vehicle.

Figure 3:
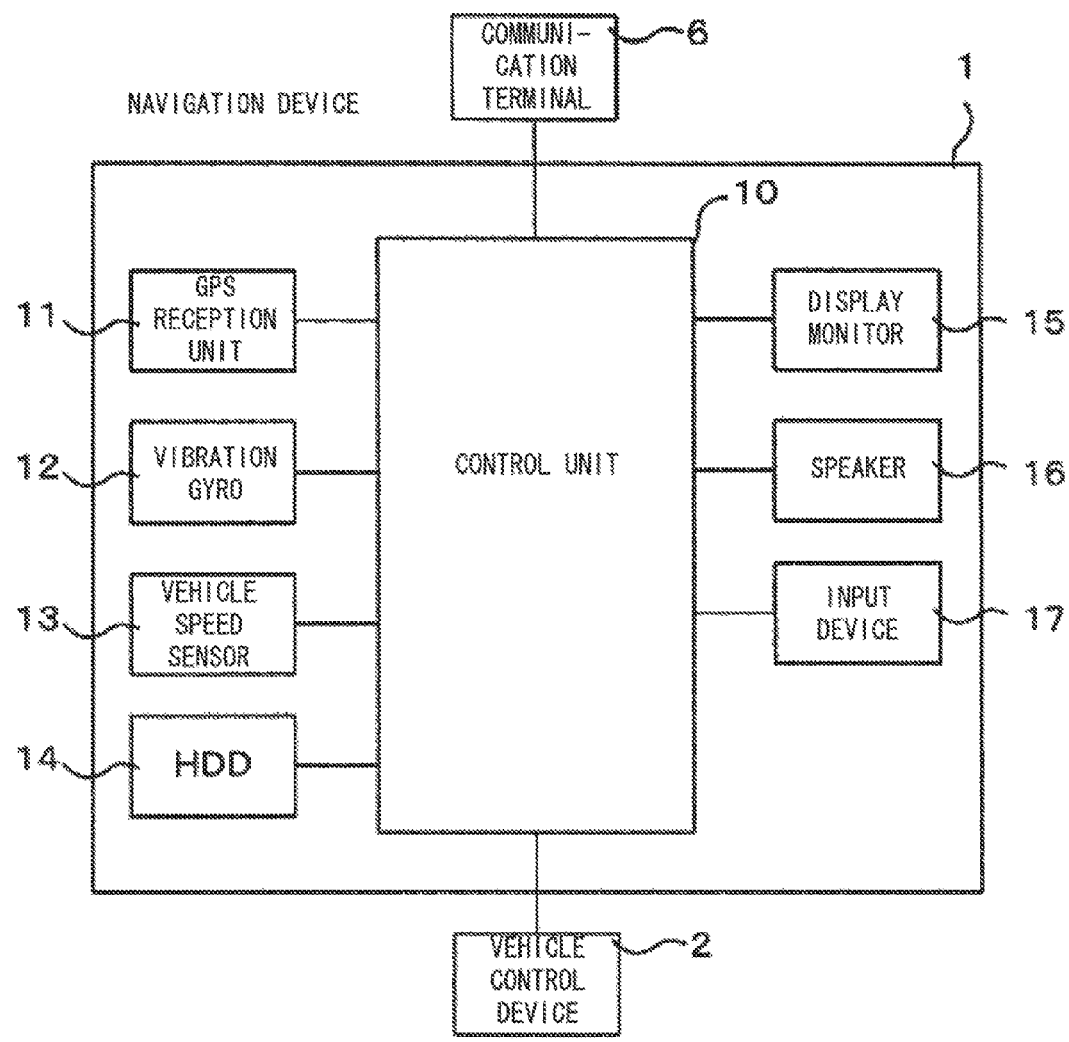
FIG. 3 shows the structure of the navigation device.

FIG. 3 is a block diagram showing the structure of the navigation device 1. The navigation device 1 comprises a control unit 10, a GPS (global positioning system) reception unit 11, a vibration gyro 12, a vehicle speed sensor 13, a hard disk drive (HDD) 14, a display monitor 15, a speaker 16 and an input device 17. It is to be noted that while the following description focuses on the navigation device 1 installed in the vehicle 100 chosen as a typical example, the navigation devices installed in the other vehicles assume similar structures.

The control unit 10, configured with a microprocessor, various types of peripheral circuits, a RAM, a ROM and the like, executes various types of processing based upon a control program and map data recorded in the HDD 14. For instance, the types of processing pertaining to the navigation function mentioned earlier executed by the control unit 10 include destination search processing executed when setting a destination, recommended route search processing executed to determine a recommended route to the selected destination, current position detection processing executed to detect the current position of the vehicle 100, various types of image display processing and sound output processing. It further executes processing in order to fulfill its function as the on-vehicle device included in the information system for automotive in FIG. 1. In more specific terms, it transmits the acceleration/deceleration information generated based upon detection results by detecting changes in the acceleration/deceleration of the vehicle 100 to the server device 500 and transmits the vehicle information to the server device 500 when requesting current travel limit area information.

The vehicle control device 2 and the communication terminal 6 are connected to the control unit 10. The control unit 10 exchanges information with these devices whenever necessary. For instance, when it needs to transmit the acceleration/deceleration information and the vehicle information to the server device 500, it outputs the information to the communication terminal 6. In addition, it takes in the remaining battery power information input thereto from the vehicle control device 2 when it needs to determine the available power remaining in the battery 3.

The GPS reception unit 11 receives a GPS signal transmitted from a GPS satellite and outputs the GPS signal thus received to the control unit 10. The GPS signal contains information pertaining to the relative position of the GPS satellite from which the particular GPS signal originated and the transmission time point at which the GPS signal was transmitted, which can be used to determine the current location of the vehicle 100. Based upon this information contained in GPS signals originating from a predetermined minimum number of GPS satellites and received via the GPS reception unit 11, the control unit 10 is able to calculate the current position of the vehicle 100.

The vibration gyro 12 is a sensor that detects the angular velocity of the vehicle 100. The vehicle speed sensor 13 is a sensor that detects the traveling speed of the vehicle 100. Based upon the results of calculation executed based upon the sensor detection results, indicating the direction along which the vehicle 100 has moved and the extent of displacement of the vehicle 100, and the results of calculation executed based upon the GPS signals described earlier, which indicate the current position of the vehicle 100, the control unit 10 executes position detection processing over predetermined time intervals and thus, the current position of the vehicle 100 is detected.

In the HDD 14, which is a nonvolatile recording medium, the control program enabling the execution of the processing described above by the control unit 10, the map data and the like are recorded. Under control executed by the control unit 10, data recorded in the HDD 14 are read out as necessary to be utilized in various types of processing and control executed by the control unit 10.

The map data recorded in the HDD 14 include route calculation data, road data and background data. The route calculation data are used in a recommended route search executed to determine a recommended route to a destination and the like. The road data express road shapes, road types and the like. The background data express objects present in the map background. It is to be noted that objects present in the map background are objects other than roads, present on the map. For instance, rivers, railway tracks, green areas, various types of structures and the like are expressed by the background data.

The term "link" is used to refer to the smallest unit representing a road portion in the map data. Namely, each road is made up with a plurality of links, each corresponding to a predetermined road segment, and the route calculation data and the road data are each expressed in units of individual links. A point connecting different links, i.e., an end point at which adjoining links meet, is referred to as a node. Information pertaining to each node included in the map data includes position information (coordinate information). It is to be noted that a point referred to as a shape interpolation point may be set as necessary within a given link between the two nodes. Information on each shape interpolation point in the map data includes position information (coordinate information) as does the node information. The position information included in the node information and the shape interpolation point information determines the shape of the corresponding link, i.e., the road shape. In short, each road in the map data stored in the HDD 14 is represented by using a plurality of nodes and a plurality of links.

For each link corresponding to a specific road segment, a link cost, determined in correspondence to the required driving time expected to elapse while the vehicle 100 travels through the particular road segment and the like, is set in the route calculation data. The navigation device 1 searches for a recommended route by determining a specific combination of links corresponding to preselected route search conditions based upon these link costs. For instance, route search conditions may be selected so that a route is searched by giving top priority to the minimum driving time and in such a case, a specific combination of links achieving the minimum length of travel time from the start point to the destination will be calculated as a recommended route.

It is to be noted that while the map data are recorded in the HDD 14 in the navigation device 1 described above, the present invention is not limited to this example and it may be adopted in conjunction with map data recorded in a recording medium other than an HDD. For instance, the present invention may be adopted in conjunction with map data recorded in a CD-ROM, a DVD-ROM or a memory card. In other words, the data may be stored in any recording medium in the navigation device 1.

The display monitor 15, at which various screens are brought up on display in the navigation device 1, is constituted with, for instance, a liquid crystal display unit. At this display monitor 15, a map screen, a recommended route guidance screen or the like is brought up on display. The specific contents of the screen brought up on display at the display monitor 15 are determined under screen display control executed by the control unit 10. The display monitor 15 is installed at a position easily visible to the user, e.g., on the dashboard or within the instrument panel in the vehicle 100.

Through the speaker 16, various types of audio information are output under control executed by the control unit 10. For instance, audio guidance providing route guidance for the vehicle 100 to the destination along the recommended route, various types of warning sounds and the like are output through the speaker 16.

The input device 17, which provides a user interface for performing various types of input operations in order to engage the navigation device 1 in operation, includes various types of input switches. The user is able to enter the name or the like of a facility or a geographic point he wishes to set as a destination, set the recommended route search conditions, select a destination among preregistered locations or scroll the map along a desired direction by operating the input device 17. Such an input device 17 may be constituted with an operation panel, a remote control unit or the like. As an alternative, the input device 17 may be integrated with the display monitor 15 in the form of a touch panel.

Once the user sets the destination and the route search conditions by operating the input device 17, the navigation device 1 designates the current position of the vehicle 100 detected, as explained earlier, as the start point, and executes route search processing by executing arithmetic processing with a predetermined algorithm based upon the route calculation data described earlier. Through this processing, a search for a recommended route from the start point to the destination is conducted. In addition, the navigation device 1 displays the recommended route determined through the search in a display mode distinguishable from other roads on the map displayed at the display monitor 15 by, for instance, displaying the recommended route in a different color. Then, it guides the vehicle 100 to the destination by outputting specific image information and audio information via the display monitor 15 and the speaker 16 as the vehicle 100 travels along the recommended route.

Next, the processing executed in the information system for automotive shown in FIG. 1 is described in detail. The control unit 10 in the navigation device 1 in the information system for automotive shown in FIG. 1 executes acceleration/deceleration information transmission processing so as to transmit the acceleration/deceleration information to the server device 500 by detecting changes in the acceleration/deceleration occurring in the vehicle 100. In addition, the arithmetic processing unit 501 in the server device 500 executes loss/regeneration parameter calculation processing for calculating loss/regeneration parameters to be used in travel continuation enabled area estimation and current travel limit area estimation processing for estimating a current travel limit area.

Figure 4:
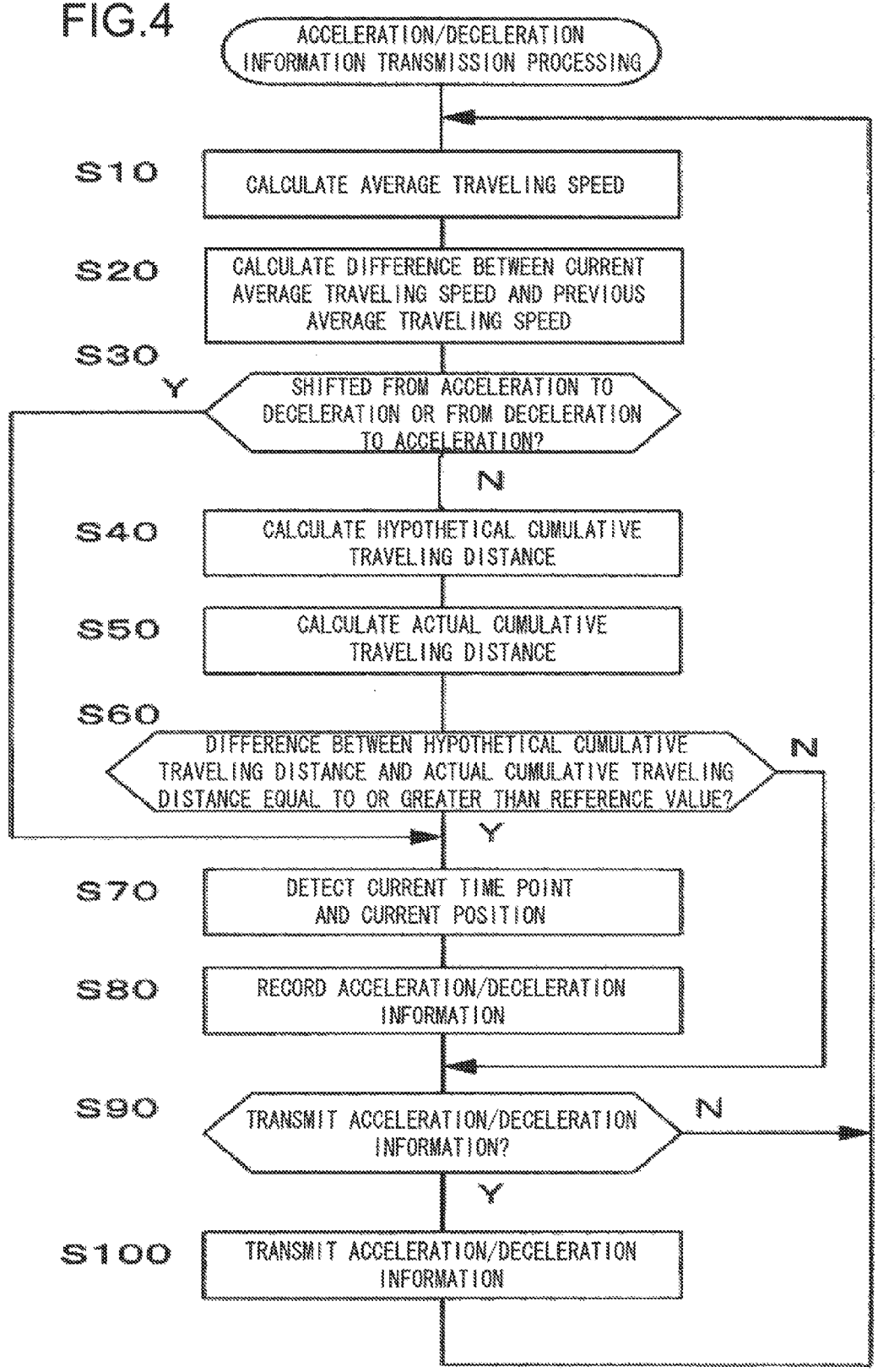
FIG. 4 presents a flowchart of the acceleration/deceleration information transmission processing.

The acceleration/deceleration information transmission processing will be described first. FIG. 4 presents a flowchart of the acceleration/deceleration information transmission processing. As long as the vehicle 100 remains in a traveling state, the control unit 10 in the navigation device 1 repeatedly executes the acceleration/deceleration information transmission processing, as indicated in the flowchart in FIG. 4, over predetermined processing cycles.

In step S10, the control unit 10 calculates an average traveling speed of the vehicle 100 during a predetermined period of time. In this embodiment, the average traveling speed of the vehicle 100 through the predetermined time period is calculated by tabulating the traveling speed of the vehicle 100 detected over predetermined intervals of, for instance, 20 ms, through a predetermined number of cycles, e.g., 25 cycles, based upon the vehicle speed signal output from the vehicle speed sensor 13, and then calculating the average value over the 25 cycles. As a result, the average traveling speed of the vehicle 100 through, for instance, a period of 500 ms is calculated.

In step S20, the control unit 10 calculates the difference between the current average traveling speed and the previous average traveling speed. In the embodiment, the average traveling speed calculated through the most recently executed step S10 processing is designated as the current average traveling speed, the average traveling speed having been calculated through the step S10 immediately processing preceding the most recent step S10 processing, is designated as the previous average traveling speed and the difference between these average traveling speeds is calculated. As a result, the difference between the average traveling speed through the current 500 ms period and the average traveling speed through the preceding 500 ms period is calculated.

In step S30, the control unit 10 makes a decision, based upon the difference between the average traveling speeds calculated in step S20, as to whether the vehicle 100 has shifted from an accelerating state to a decelerating state or from a decelerating state to an accelerating state. This decision may be made by comparing the positive/negative sign appended to the difference between the average traveling speeds having been calculated in a preceding session with the positive/negative sign appended to the difference between the average traveling speeds calculated through the current session. For instance, the difference between the average traveling speeds calculated through the preceding session may take a positive value indicating acceleration and the difference between the average traveling speeds calculated through the current session may take a negative value indicating deceleration. In such a case, the control unit 10 is able to determine that the vehicle 100 has shifted from an accelerating state to a decelerating state. If, on the other hand, the difference between the average traveling speeds calculated through the preceding session takes a negative value indicating deceleration and the difference between the average traveling speeds calculated through the current session takes a positive value indicating acceleration, the control unit 10 is able to determine that the vehicle 100 has shifted from a decelerating state to an accelerating state. If the vehicle 100 is determined to have shifted from an accelerating state to a decelerating state or from a decelerating state to an accelerating state based upon such a switch in the signs appended to the values representing the average traveling speed differences, the shift is detected as an acceleration/deceleration change and the operation proceeds to step S70. However, if the average traveling speed difference calculated through the previous session and the average traveling speed difference calculated through the current session are appended with matching signs, the operation proceeds to step S40.

Figure 5:
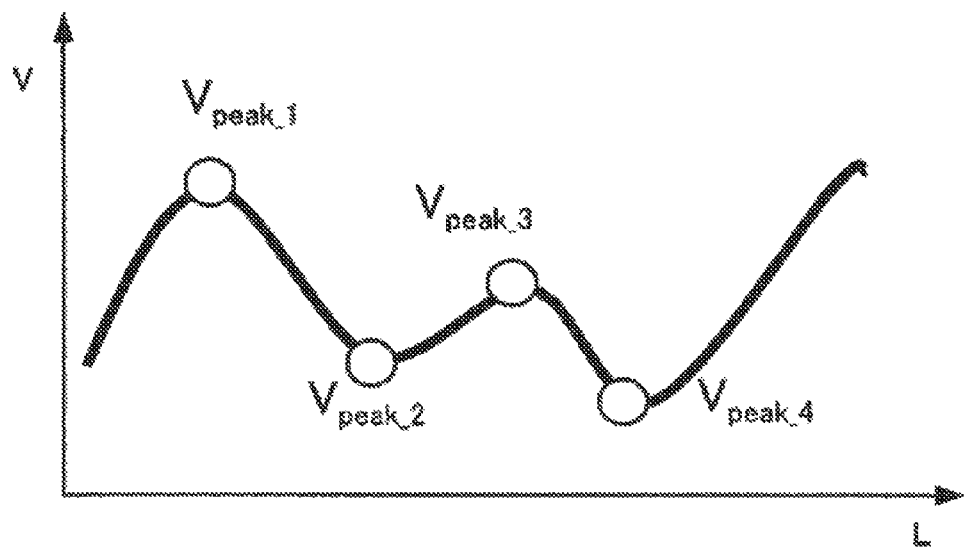
FIG. 5 illustrates how acceleration/deceleration changeovers are detected.

FIG. 5 illustrates how acceleration/deceleration changes may be detected through the processing described above. In the graph resented in FIG. 5, the vehicle speed V of the vehicle 100 is indicated along the vertical axis and the traveling distance L covered by the vehicle 100 is indicated along the horizontal axis. When the vehicle speed V indicated in the graph is detected for the traveling distance L, acceleration/deceleration changes are each detected through step S30, in correspondence to a specific vehicle speed among vehicle speeds $V_{peak\_1}$, $V_{peak\_2}$, $V_{peak\_3}$, and $V_{peak\_4}$, detected at various points each representing a peak or a trough in the graph.

It is desirable that in the decision-making in step S30 be executed by ensuring that even when the sign switch occurs as described above, the vehicle 100 is not judged to have shifted from an accelerating state to a decelerating state or from a decelerating state to an accelerating state unless the difference between the previous average traveling speed and the current average traveling speed exceeds a predetermined ratio, e.g., unless it exceeds 1%. Namely, if the difference between the average traveling speeds calculated in step S20 is equal to or less than the predetermined ratio, the operation should proceed to step S40 without executing the decision-making in step S30, i.e., so as to ensure that no acceleration/deceleration change is detected. However, it is further desirable that after the vehicle 100 has sustained a given traveling state over a significant length of time following the last detection of an acceleration/deceleration change, an acceleration/deceleration change be detected upon detecting a sign switch as described earlier, even if the difference between the average traveling speeds is equal to or less than the predetermined ratio. The acceleration/deceleration change detection processing may be fine-tuned as described above based upon, for instance, the length of time having elapsed since the most recent detection of an acceleration/deceleration change, so as to detect an acceleration/deceleration change with different criteria.

In step S40, the control unit 10 calculates a hypothetical cumulative traveling distance that would have been covered by the vehicle 100, after the acceleration/deceleration information was most recently recorded in step S80, which will be described in detail later. In this step, the cumulative traveling distance ranging from the position of the vehicle 100 assumed when the acceleration/deceleration information was last recorded, which is designated as an origin point, to the current position is calculated by assuming that the vehicle 100 has continuously traveled at a constant estimated acceleration/deceleration rate. The cumulative traveling distance thus calculated is then designated as the hypothetical cumulative traveling distance. The estimated acceleration/deceleration rate at which the vehicle 100 is assumed to have traveled since passing through the origin point can be determined based upon the traveling speed at which the vehicle 100 passed through the origin point, i.e., the traveling speed of the vehicle 100 when the acceleration/deceleration information was last recorded. For instance, the estimated acceleration/deceleration rate of the vehicle 100, after having passed through the origin point, can be determined based upon the difference between the traveling speed at which the vehicle 100 passed through the origin point and the traveling speed of the vehicle 100 detected immediately afterwards. It is to be noted that the acceleration/deceleration information is recorded in step S80 upon detecting an acceleration/deceleration change in step S30 or upon deciding in step S60, which is to be described later, that the difference between the hypothetical cumulative traveling distance and the actual cumulative traveling distance is equal to or greater than a reference value.

In step S50, the control unit 10 calculates the actual cumulative traveling distance covered by the vehicle 100, ranging from the origin point to the current position. In this step, the actual cumulative traveling distance is calculated by adding up the traveling distances covered by the vehicle 100 in correspondence to the individual cycles based upon the traveling speeds detected through the predetermined cycles based upon the vehicle speed signals output from the vehicle speed sensor 13 after the vehicle passed through the origin point.

In step S60, the control unit 10 makes a decision as to whether or not the difference between the hypothetical cumulative traveling distance calculated in step S40 and the actual cumulative traveling distance calculated in step S50 is equal to or greater than a preselected specific reference value. If the difference between the hypothetical cumulative traveling distance and the actual cumulative traveling distance is determined to be equal to or greater than the predetermined reference value of, for instance, 1.5 m, the position of the vehicle 100 just as the positive decision is made is detected as an equivalent point, which is to be regarded as equivalent to an acceleration/deceleration change, before the operation proceeds to step S70. If, on the other hand, the difference between the hypothetical cumulative traveling distance and the actual cumulative traveling distance is less than the reference value, the operation proceeds to step S90.

In step S70, the control unit 10 detects the current time point and the current position of the vehicle 100. In this step, the current time point and the current position can be detected based upon the GPS signals received via the GPS reception unit 11.

In step S80, the control unit 10 records acceleration/deceleration information indicating the average traveling speed calculated in step S10 and the current time point and the current position detected in step S70 into the HDD 14. Through the processing executed in step S80, the time point at which an acceleration/deceleration change is detected in step S30 or the time point at which an equivalent point regarded as equivalent to an acceleration/deceleration change is detected in step S60 and the corresponding position of the vehicle 100 and the corresponding vehicle speed at the particular time point are recorded as the acceleration/deceleration information into the HDD 14.

In step S90, the control unit 10 makes a decision as to whether or not yet-to-be transmitted acceleration/deceleration information among sets of acceleration/deceleration information having been recorded thus far is to be transmitted from the navigation device 1 to the server device 500. This decision may be made by determining whether or not a predetermined transmission condition exists. For instance, it may be decided that acceleration/deceleration information should be transmitted if a predetermined length of time or more has elapsed since the most recent transmission or if the number of sets of acceleration/deceleration information having been recorded has become equal to or greater than a predetermined value, and upon determining that acceleration/deceleration information is to be transmitted, the operation proceeds to step S100. If, on the other hand, such a transmission condition does not exist, it is decided that acceleration/deceleration information is not to be transmitted, and in this case, the operation returns to step S10 to repeatedly execute the processing described earlier.

In step S100, the control unit 100 transmits the yet-to-be transmitted acceleration/deceleration information recorded in the HDD 14 in a batch to the server device 500. In this step, a plurality of sets of yet-to-be transmitted acceleration/deceleration information, each representing a specific combination of time point, position and speed, are read out from the HDD 14 where the sets of yet-to-be transmitted acceleration/deceleration information are recorded and the plurality of sets of yet-to-be transmitted acceleration/deceleration information are output in a batch to the communication terminal 6, so as to allow the plurality of sets of acceleration/deceleration information to be transmitted to the server device 500 via the communication terminal 6 and the mobile communication network 400. In addition, information indicating features characterizing the vehicle 100, e.g., vehicle type information, is transmitted together with the acceleration/deceleration information at this time. It is to be noted that following the execution of the processing in step S100, the transmitted acceleration/deceleration information may be deleted from the HDD 14.

Upon executing the processing in step S100, the control unit 10 returns to step S10 to repeatedly execute the processing as indicated in the flowchart presented in FIG. 4.

Figure 6:
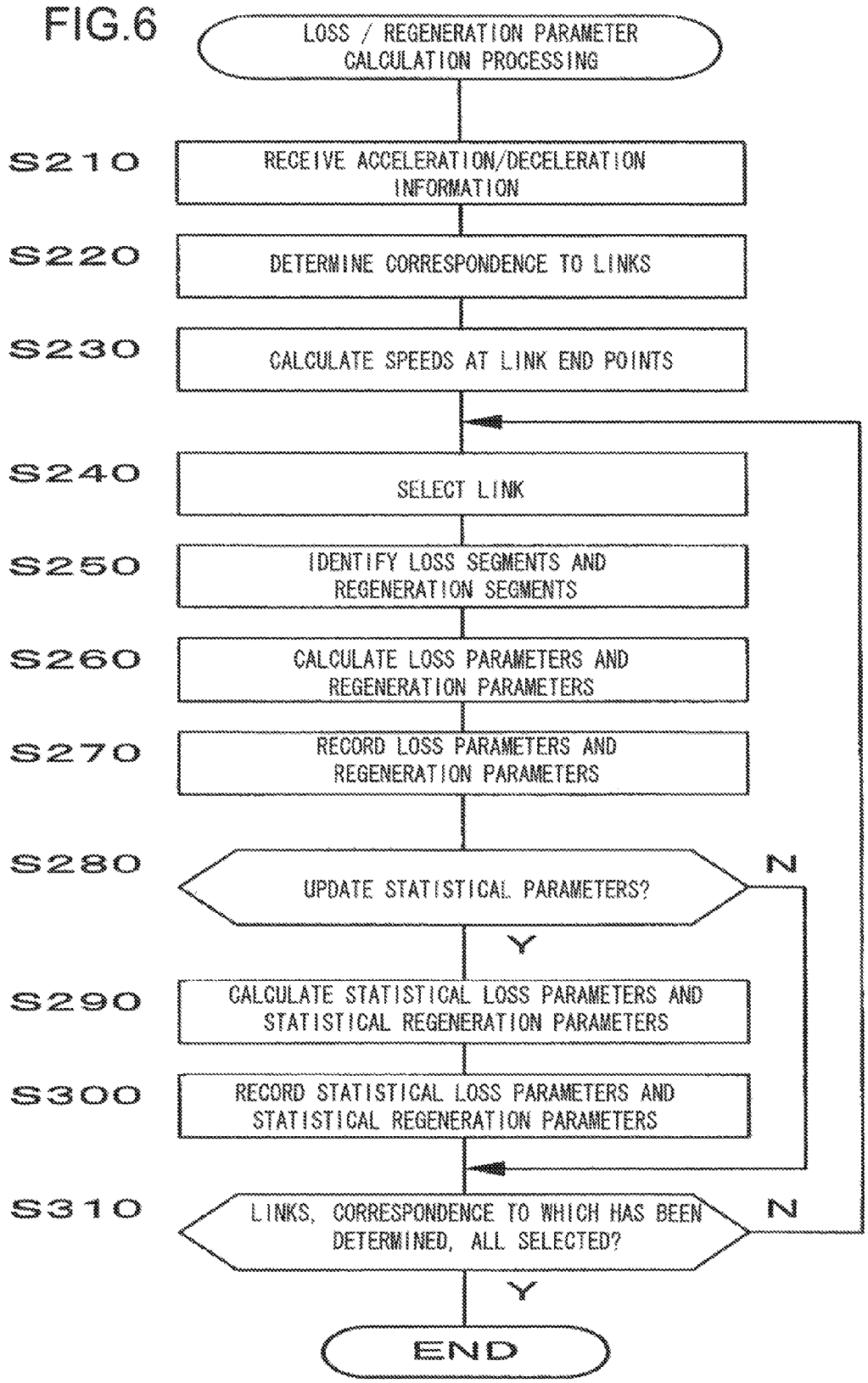
FIG. 6 presents a flowchart of the loss/regeneration parameter calculation processing.

Next, the loss/regeneration parameter calculation processing will be described. FIG. 6 presents a flowchart of the loss/regeneration parameter calculation processing. In response to the acceleration/deceleration information transmitted from the navigation device 1 installed in the vehicle 100, 200 or 300, the arithmetic processing unit 501 in the server device 500 executes the loss/regeneration parameter calculation processing as shown in the flowchart presented in FIG. 6. It is to be noted that the following description will be provided by assuming that the acceleration/deceleration information has been transmitted from the navigation device 1 installed in the vehicle 100.

In step S210, the arithmetic processing unit 501 receives the acceleration/deceleration information transmitted from the navigation device 1. This acceleration/deceleration information is transmitted as a batch of a plurality of sets of acceleration/deceleration information to the server device 500 from the navigation device 1 as the processing in step S100 in FIG. 4 is executed. In addition, the arithmetic processing unit 501 also receives information indicating the characteristic features of the vehicle 100, e.g., vehicle type information or the like, transmitted together with the acceleration/deceleration information from the navigation device 1 in this step.

In step S220, the arithmetic processing unit 501 determines the correspondence between each set of acceleration/deceleration information received in step S210 and a specific link. In this step, the position at which each set of acceleration/deceleration information was obtained, i.e., the position assumed by the vehicle 100 when the acceleration/deceleration change was detected, is determined based upon the position information included in the particular set of acceleration/deceleration information and the link corresponding to the position is identified. In addition, a specific position on the link is determined by correcting, as necessary, the position, at which the set of acceleration/deceleration information was obtained, in relation to the link thus identified. It is to be noted that link information used when identifying the link and determining the specific position on the link, as described above, can be obtained from the map data stored in, for instance, the storage unit 502.

As the arithmetic processing unit 501 executes the processing in step S220 as described above, it is able to determine the correspondence between each set of acceleration/deceleration information having been received and a specific link and then determine specific positions taken on the particular link, which correspond to all sets of acceleration/deceleration information obtained while the vehicle was traveling through the link among the sets of acceleration/deceleration information having been received.

In step S230, the arithmetic processing unit 501 calculates the speed at an end point of each link the correspondence of which to specific sets of acceleration/deceleration information has been determined in step S220. In the embodiment, the speed at each link end point is calculated based upon the speed information included in the sets of acceleration/deceleration information having been obtained at two positions, each successive to the particular link end point on either side of the link end point among the specific positions on the various links having been determined in step S220 in correspondence to the individual sets of acceleration/deceleration information having been received taken on a given link, i.e., there may be a plurality of sets of acceleration/deceleration information obtained while the vehicle was traveling through the link.

For instance, the speed $V_t$ at the link end point can be calculated as expressed in (1) below, with $V_0$ and $V_1$ representing the speeds indicated in the speed information included in the sets of acceleration/deceleration information obtained at the two positions successive to the link end point on the two sides thereof. It is to be noted that $L_0$ and $L_1$ in expression (1) respectively represent the distances from the link end point to the two specific positions successive to the link end point on the two sides.

$$V_t = V_0 + (V_1 - V_0) \times \frac{L_0}{L_0 + L_1} \qquad (1)$$

It is to be noted that the specific position determined in correspondence to a set of acceleration/deceleration information is present only on one side of one of the two end points at each of the two links located at the two outer ends of the link string among the series of links, the correspondence of which to the individual sets of acceleration/deceleration information is determined in step S220. This means that the speed cannot be calculated for such an end point through the method described above. For this reason, it is desirable to exempt such links from the subsequent processing.

In step S240, the arithmetic processing unit 501 selects one of the links, the correspondence of which to the acceleration/deceleration information has been determined in step S220. Namely, it selects a link among the links corresponding to the positions taken by the vehicle 100 when the various sets of acceleration/deceleration information were obtained.

In step S250, the arithmetic processing unit 501 identifies a loss segment and a regeneration segment in the link selected in step S240. In this step, each specific position on the link determined in correspondence to the acceleration/deceleration information is ascertained based upon the correspondence determined in relation to the particular link in step S220 and the link is split into a plurality of segments by using such positions as dividing points. In addition, based upon the acceleration/deceleration information, the correspondence of which to the particular link has been determined in step S220, and the speeds at the two end points of the link calculated in step S230, an energy change quantity indicating the extent of energy change occurring at the vehicle 100 over each of the segments resulting from the split is calculated. Based upon the results of the energy change quantity calculation, each segment is categorized as a loss segment or a regeneration segment and thus is identified as either a loss segment or a regeneration segment.

Figure 7:
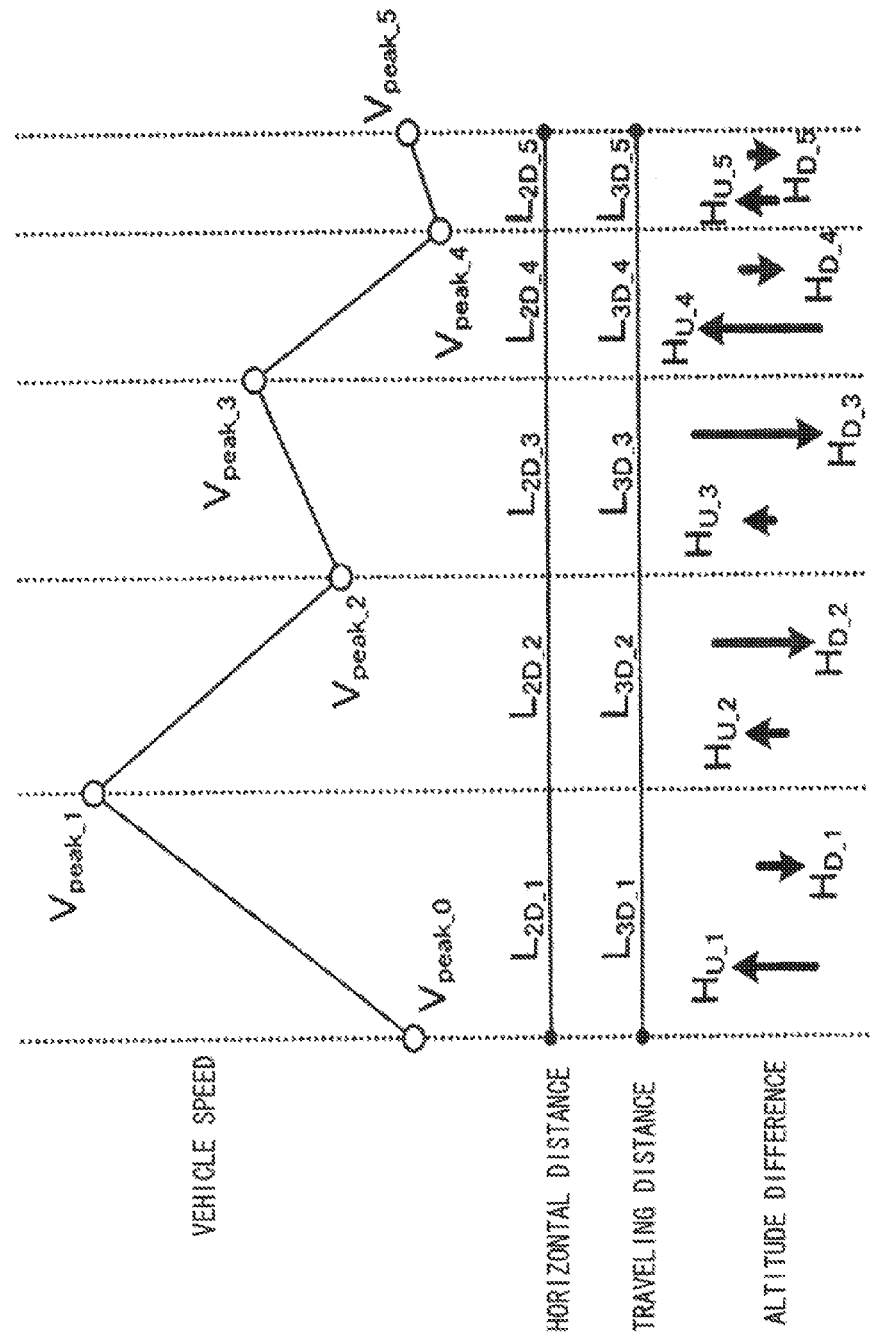
FIG. 7 illustrates how a given segment may be determined to be a loss segment or a regeneration segment.

The following is a description of a method that may be adopted in step S250 when determining whether a given segment is a loss segment or a regeneration segment given in reference to FIG. 7. In the example presented in FIG. 7, the speed information included in the sets of acceleration/deceleration information corresponding to various positions taken between the two end points of the calculation target link indicates vehicle speeds $V_{peak\_1}$, $V_{peak\_2}$, $V_{peak\_3}$ and $V_{peak\_4}$ respectively and vehicle speeds $V_{peak\_0}$ and $V_{peak\_5}$ are calculated as the speeds at the two end points of the calculation target link. It is to be noted that each link is assigned with its own link ID and that n is set as the link ID of this particular link.

While traveling through the link shown in FIG. 7, the vehicle 100 accelerates in the first segment, by increasing its speed from $V_{peak\_0}$ to $V_{peak\_1}$, decelerates in the next segment as its speed shifts from $V_{peak\_1}$ to $V_{peak\_2}$ and then accelerates again in the following segment as its speed shifts from $V_{peak\_2}$ to $V_{peak\_3}$. It then decelerates in the next segment as its speed shifts from $V_{peak\_3}$ to $V_{peak\_4}$, and the vehicle 100 picks up speed in the last segment, increasing its speed from $V_{peak\_4}$ to $V_{peak\_5}$.

In step S250, horizontal distances $L_{2D\_1}$ through $L_{2D\_5}$, traveling distances $L_{3D\_1}$ through $L_{3D\_5}$, altitude differences $H_{U\_1}$ through $H_{U\_5}$ along the ascending direction and altitude differences $H_{D\_1}$ through $H_{D\_5}$ along the descending direction are determined in correspondence to the individual segments. These values may be calculated based upon the map data stored in the storage unit 502. For instance, assuming that the horizontal distance over which the particular link ranges, as indicated in the map data, is $L_{2D}$, the horizontal distances $L_{2D\_1}$ through $L_{2D\_5}$ of the individual segments can be determined by dividing this horizontal distance $L_{2D}$ into portions, each corresponding to the ratio of the length of a specific segment to the horizontal distance $L_{2D}$. In addition, the altitude differences $H_{U\_1}$ through $H_{U\_5}$ along the ascending direction corresponding to the individual segments and the altitude differences $H_{D\_1}$ through $H_{D\_5}$ along the descending direction corresponding to the individual segments can be determined based upon altitude information indicating the altitudes at various points set in advance within the link in the map data. Based upon the horizontal distances $L_{2D\_1}$ through $L_{2D\_5}$, the altitude differences $H_{U\_1}$ through $H_{U\_5}$ along ascending direction and the altitude differences $H_{D\_1}$ through $H_{D\_5}$ along the descending direction, respectively corresponding to the individual segments, having been determined as described above, the traveling distances $L_{3D\_1}$ through $L_{3D\_5}$ are determined, each in correspondence to one of the segments. It is to be noted that the altitude differences $H_{D\_1}$ through $H_{D\_5}$ along the descending direction take negative values.

Next, an energy change quantity is determined in correspondence to each segment by using the various values obtained as described above. For instance, the energy change quantity in the first segment can be calculated as expressed in (2) by using the vehicle speed $V_{peak\_0}$, at the start point of the segment, the vehicle speed $V_{peak\_1}$ at the end point of the segment, the horizontal distance $L_{2D\_1}$ and the traveling distance $L_{3D\_1}$ corresponding to the segment, the ascending altitude difference $H_{U\_1}$ and the descending altitude difference $H_{D\_1}$ corresponding to the segment.

$$E_1 = \frac{\lambda_1}{2} \times (V_{peak\_1}^2 - V_{peak\_0}^2) + \\ \lambda_2 \times (H_{U\_1} + H_{D\_1}) + \lambda_3 \times L_{2D\_1} + \lambda_4 \times V_{ave}^2 \times L_{3D\_1} \quad (2)$$

$\lambda_1$, $\lambda_2$, $\lambda_3$ and $\lambda_4$ in expression (2) above respectively represent an acceleration resistance coefficient, a grade resistance coefficient, a road surface resistance coefficient and an air resistance coefficient. These coefficients are constants, determined in correspondence to the characteristics of the vehicle 100 such as its weight and shape and physical constants including the gravitational acceleration constant, and each coefficient take a value determined based upon the vehicle type information or the like received together with the acceleration/deceleration information in step S210. In addition, $V_{ave}$ in expression (2) represents an average vehicle speed in the particular link, taking a value determined based upon a specific value set in advance in correspondence to the link or the like.

It is to be noted that energy change quantities in other segments can also be calculated as expressed in (2), based upon the vehicle speed at the start point, the vehicle speed at the end point, the horizontal distance, the traveling distance, the altitude difference along the ascending direction and the altitude difference along the descending direction.

Once the energy change quantities are calculated in correspondence to the individual segments as described above, a decision is then made as to whether each segment is a loss segment or a regeneration segment by checking whether the corresponding energy change quantity is represented by a positive value or a negative value. Namely, if a given energy change quantity is calculated as a positive value, it indicates that energy loss occurred while the vehicle 100 was traveling through the particular segment. Accordingly, the segment can be judged to be a loss segment. If, on the other hand, the energy change quantity takes a negative value it indicates that energy was regenerated as the vehicle 100 traveled through the corresponding segment. Accordingly, the segment can be judged to be a regeneration segment. By making this decision for the individual segments, all the segments can each be determined to be either a loss segment or a regeneration segment.

In step S250, a decision is made through the method described above as to whether each of the segments formed by dividing the link selected in step S240 is a loss segment or a regeneration segment. For instance, the first segment, the third segment and the last segment among the various segments shown in FIG. 7 are each judged to be a loss segment, whereas the remaining segments, i.e., the second segment and the fourth segment, are judged to be regeneration segments.

In step S260, the arithmetic processing unit 501 calculates loss parameters used to indicate the overall traveling conditions in the individual loss segments identified in step S250 and regeneration parameters used to indicate the overall traveling conditions in the individual regeneration segments identified in step S250. In this step, the loss parameters and the regeneration parameters are calculated based upon the results of the decision made in step S250 as to whether each segment is a loss segment or a regeneration segment, through the method that will be described next in reference to the example presented in FIG. 7.

A loss acceleration rate $v_{l\_n}$ (1), a loss segment horizontal distance $L_{2Dl\_n}$ (1), a loss segment traveling distance $L_{3Dl\_n}$ (1), a loss segment UP altitude difference $H_{Ul\_n}$ (1) and a loss segment DOWN altitude difference $H_{Dl\_n}$ (1), to be used as the loss parameters for the link shown in FIG. 7, and a regeneration acceleration rate $v_{r\_n}$ (1), a regeneration segment horizontal distance $L_{2Dr\_n}$ (1), a regeneration segment traveling distance $L_{3Dr\_n}$ (1), a regeneration segment UP altitude difference $H_{Ur\_n}$ (1) and a regeneration segment DOWN altitude difference $H_{Dr\_n}$ (1), to be used as regeneration parameters for the link shown in FIG. 7, can be calculated as respectively expressed in (3) through (12) below. It is to be noted that the loss segment DOWN altitude difference $H_{Dl\_n}$ (1) and the regeneration segment DOWN altitude difference $H_{Dr\_n}$ (1) are each calculated as a negative value.

$$v_{l\_n}(1)=(V^2_{peak\_1}-V^2_{peak\_0})+(V^2_{peak\_4}-V^2_{peak\_3})+V^2_{peak\_5}-V^2_{peak\_4}) \quad (3)$$

$$v_{r\_n}(1)=(V^2_{peak\_2}-V^2_{peak\_1})+(V^2_{peak\_3}-V^2_{peak\_2}) \quad (4)$$

$$L_{2Dl\_n}(1)=L_{2D\_1}+L_{2D\_4}+L_{2D\_5} \quad (5)$$

$$L_{2Dr\_n}(1)=L_{2D\_2}+L_{2D\_3} \quad (6)$$

$$L_{3Dl\_n}(1)=L_{3D\_1}+L_{3D\_4}+L_{3D\_5} \quad (7)$$

$$L_{3Dr\_n}(1)=L_{3D\_2}+L_{3D\_3} \quad (8)$$

$$H_{Ul\_n}(1)=H_{U\_1}+H_{U\_4}+H_{U\_5} \quad (9)$$

$$H_{Ur\_n}(1)=H_{U\_2}+H_{U\_3} \quad (10)$$

$$H_{Dl\_n}(1)=H_{D\_1}+H_{D\_4}+H_{U\_5} \quad (11)$$

$$H_{Dr\_n}(1)=H_{D\_2}+H_{D\_3} \quad (12)$$

In step S260, the values taken for the loss parameters and the regeneration parameters are calculated as has been described above.

In step S270, the arithmetic processing unit 501 records the loss parameters and the regeneration parameters calculated in step S260 into the storage unit 502.

FIG. 8 presents examples of loss/regeneration parameters that may be recorded into the storage unit 502. The figure lists the various values calculated for the loss/regeneration parameters as described earlier in correspondence to the link in FIG. 7 assigned with the link ID "n". The values calculated for the loss/regeneration parameters as described earlier are recorded in the storage unit 502 in correspondence to each link.

In step S280, the arithmetic processing unit 501 makes a decision as to whether or not to update statistical parameters, which will be described in detail later. This decision may be made by determining whether or not a specific update condition exists. For instance, if a predetermined length of time or more has elapsed since the most recent update or if a predetermined number of sets of loss/regeneration parameters or more has been newly recorded into the storage unit 502, the arithmetic processing unit 501 decides that the statistical parameters are to be updated and the operation proceeds to step S290. If, on the other hand, no such update condition exists, the arithmetic processing unit 501 decides that the statistical parameters are not to be updated and the operation proceeds to step S310.

In step S290, the arithmetic processing unit 501 calculates the statistical parameters to be used to estimate a power consumption quantity or a power regeneration quantity in correspondence to the particular link. In this step, statistical loss parameters and statistical regeneration parameters, to be used as the statistical parameters, are calculated by statistically processing the individual loss parameters and regeneration parameters recorded in the storage unit 502.

The following is a description of a method that may be adopted when calculating the statistical parameters in step S290. FIG. 9 illustrates how the statistical parameters are calculated. FIG. 9 shows the loss parameters for the link assigned with the link ID n, i.e., values $v_{l\_n}$ (1) through $v_{l\_n}$ (4) calculated for the loss acceleration rate, values $L_{2Dl\_n}$ (1) through $L_{2Dl\_n}$ (4) calculated for the loss segment horizontal distance, values $L_{3Dl\_n}$ (1) through $L_{3Dl\_n}$ (4) calculated for the loss segment traveling distance, values $H_{Ul\_n}$ (1) through $H_{Ul\_n}$ (4) calculated for the loss segment UP altitude difference and values $H_{Dl\_n}$ (1) through $H_{Dl\_n}$ (4) calculated for the loss segment DOWN altitude difference, and the regeneration parameters for the link assigned with the link ID n, i.e., values $v_{r\_n}$ (1) through $v_{r\_n}$ (4) calculated for the regeneration acceleration rate, values $L_{2Dr\_n}$ (1) through $L_{2Dr\_n}$ (4) calculated for the regeneration segment horizontal distance, values $L_{3Dr\_n}$ (1) through $L_{3Dr\_n}$ (4) calculated for the regeneration segment traveling distance, values $H_{Ur\_n}$ (1) through $H_{Ur\_n}$ (4) calculated for the regeneration segment UP altitude difference and values $H_{Dr\_n}$ (1) through $H_{Dr\_n}$ (4) calculated for the regeneration segment DOWN altitude difference, which are all recorded in the storage unit 502.

The statistical parameters for the link assigned with the link ID "n" can each be calculated by determining a statistical average of the values taken for a specific parameter. Namely, a statistical loss acceleration rate $v_{l\_n}$, a statistical loss segment horizontal distance $L_{2Dl\_n}$, a statistical loss segment traveling distance $L_{3Dl\_n}$, a statistical loss segment UP altitude difference $H_{Ul\_n}$ and a statistical loss segment DOWN altitude difference $H_{Dl\_n}$, to be used as statistical loss parameters, and a statistical regeneration acceleration rate $v_{r\_n}$, a statistical regeneration segment horizontal distance $L_{2Dr\_n}$, a statistical regeneration segment traveling distance $L_{3Dr\_n}$, a statistical regeneration segment UP altitude difference $H_{Ur\_n}$ and a statistical regeneration segment DOWN altitude difference $H_{Dr\_n}$, to be used as statistical regeneration parameters, can be calculated respectively as expressed in (13) through (22) below. It is to be noted that the statistical loss segment DOWN altitude difference $H_{Dl\_n}$ and the statistical regeneration segment DOWN altitude difference $H_{Dr\_n}$ each take a negative value.

$$v_{l\_n} = \frac{v_{l\_n}(1) + v_{l\_n}(2) + v_{l\_n}(3) + v_{l\_n}(4)}{4} \quad (13)$$

$$v_{r\_n} = \frac{v_{r\_n}(1) + v_{r\_n}(2) + v_{r\_n}(3) + v_{r\_n}(4)}{4} \quad (14)$$

$$L_{2Dl\_n} = \frac{L_{2Dl\_n}(1) + L_{2Dl\_n}(2) + L_{2Dl\_n}(3) + L_{2Dl\_n}(4)}{4} \quad (15)$$

$$L_{2Dr\_n} = \frac{L_{2Dr\_n}(1) + L_{2Dr\_n}(2) + L_{2Dr\_n}(3) + L_{2Dr\_n}(4)}{4} \quad (16)$$

$$L_{3Dl\_n} = \frac{L_{3Dl\_n}(1) + L_{3Dl\_n}(2) + L_{3Dl\_n}(3) + L_{3Dl\_n}(4)}{4} \quad (17)$$

$$L_{3Dr\_n} = \frac{L_{3Dr\_n}(1) + L_{3Dr\_n}(2) + L_{3Dr\_n}(3) + L_{3Dr\_n}(4)}{4} \quad (18)$$

$$H_{Ul\_n} = \frac{H_{Ul\_n}(1) + H_{Ul\_n}(2) + H_{Ul\_n}(3) + H_{Ul\_n}(4)}{4} \quad (19)$$

$$H_{Ur\_n} = \frac{H_{Ur\_n}(1) + H_{Ur\_n}(2) + H_{Ur\_n}(3) + H_{Ur\_n}(4)}{4} \quad (20)$$

$$H_{Dl\_n} = \frac{H_{Dl\_n}(1) + H_{Dl\_n}(2) + H_{Dl\_n}(3) + H_{Dl\_n}(4)}{4} \quad (21)$$

$$H_{Dr\_n} = \frac{H_{Dr\_n}(1) + H_{Dr\_n}(2) + H_{Dr\_n}(3) + H_{Dr\_n}(4)}{4} \quad (22)$$

In step S290, the values taken for the statistical loss parameters and the statistical regeneration parameters are calculated as has been described above. It is to be noted that the values taken for the loss/regeneration parameters, recorded in the storage unit 502, may be sorted in correspondence to predetermined conditions and the statistical loss parameters and the statistical regeneration parameters may be calculated through the calculation method described above by using the values sorted into a specific group. For instance, the loss/regeneration parameter values may be sorted into groups of values each corresponding to a specific type of vehicle from which the acceleration/deceleration information used for the loss·regeneration parameter calculation was obtained, a specific time frame over which the acceleration/deceleration information used for the loss/regeneration parameter calculation was obtained, or a specific day of the week on which the acceleration/deceleration information used for the loss/regeneration parameter calculation was obtained, and the statistical loss parameter values and the statistical regeneration parameter values may be calculated by using the values in each group.

In step S300, the arithmetic processing unit 501 records the statistical loss parameters and the statistical regeneration parameters calculated in step S290, into the storage unit 502. It is to be noted that if the storage unit 502 holds values previously calculated and recorded as the statistical loss parameters and the statistical regeneration parameters, those values are updated with the values more recently calculated through step S290.

In step S310, the arithmetic processing unit 501 makes a decision as to whether or not all the links, the correspondence of which to specific sets of acceleration/deceleration information has been determined in step S220, have been selected in step S240. If it is decided that there is any link yet to be selected among these selection target links, the operation returns to step S240 to select such a link and then the processing described above is executed for the particular link. If, on the other hand, all the selection target links have been selected, the processing in the flowchart presented in FIG. 6 ends.

Next, the current travel limit area estimation processing will be explained. FIG. 10 presents a flowchart of the current travel limit area estimation processing. The current travel limit area estimation processing is executed as shown in the flowchart presented in FIG. 10 by the arithmetic processing unit 501 in the server device 500 in response to a current travel limit area information request issued in the form of the vehicle information transmitted from the navigation device 1 installed in the vehicle 100, 200 or 300. It is to be noted that the following description will be given by assuming that the vehicle information has been transmitted from the navigation device 1 installed in the vehicle 100.

In step S410, the arithmetic processing unit 501 receives the vehicle information transmitted from the navigation device 1. This vehicle information includes the information indicating the remaining battery power available in the vehicle 100, the position information indicating the position of the vehicle 100 and the information indicating the characteristic feature of the vehicle 100 pertaining to its fuel consumption, such as the vehicle type information. In response to an instruction for issuing a current travel limit area information request, provided through, for instance, a user operation, the navigation device 1 executes processing for obtaining the various types of information and transmitting them as the vehicle information. As a result, the vehicle information pertaining to the vehicle 100 is transmitted from the navigation device 1 to the server device 500 via the communication terminal 6 and the mobile communication network 400.

In step S420, the arithmetic processing unit 501 determines the current position of the estimation target vehicle based upon the vehicle information received in step S410. In this step, the vehicle 100 equipped with the navigation device 1 having transmitted the vehicle information is designated as the estimation target vehicle and the position of the vehicle 100 is determined based upon the position information included in the vehicle information.

In step S430, the arithmetic processing unit 501 selects a link based upon the position of the estimation target vehicle determined in step S420, i.e., based upon the position of the vehicle 100. Links present ahead relative to the position of the vehicle 100 designated as the estimation target vehicle are selected one at a time, i.e., each time step S430 is executed, starting with the link closest to the vehicle position.

In step S440, the arithmetic processing unit 501 reads out the statistical loss parameter values and the statistical regeneration parameter values calculated in correspondence to the link selected in step S430, from the storage unit 502. The statistical loss parameters and the statistical regeneration parameters read out in this step have been recorded in step S300 in FIG. 6, executed as has been described earlier as part of a previous session of the loss/regeneration parameter calculation processing.

In step S450, the arithmetic processing unit 501 calculates an estimated power consumption quantity or an estimated power regeneration quantity corresponding to the particular link based upon the statistical loss parameter values and the statistical regeneration parameter values read out in step S440. For instance, an estimated power consumption quantity (or an estimated power regeneration quantity) $E_n$ for the link assigned with the link ID "n" can be calculated as expressed in (23) below based upon the statistical loss parameters, i.e., the statistical loss acceleration rate $v_{l\_n}$, the statistical loss segment horizontal distance $L_{2Dl\_n}$, the statistical loss segment traveling distance $L_{3Dl\_n}$, the statistical loss segment UP altitude difference $H_{Ul\_n}$ and the statistical loss segment DOWN altitude difference $H_{Dl\_n}$, and the statistical regeneration parameters, i.e., the statistical regeneration acceleration rate $v_{r\_n}$, statistical regeneration segment horizontal distance $L_{2Dr\_n}$, the statistical regeneration segment traveling distance $L_{3Dr\_n}$, the statistical regeneration segment UP altitude difference $H_{Ur\_n}$ and the statistical regeneration segment DOWN altitude difference $H_{Dr\_n}$.

$$E_n = C \times \left\{ \frac{\kappa_1}{2} \times v_{L\_n} + \kappa_2 \times (H_{Ul\_n} + H_{Dl\_n}) + \kappa_3 \times L_{2Dl\_n} + \kappa_4 \times V_n^2 \times L_{3Dl\_n} \right\} + C \times R \times \left\{ \frac{\kappa_1}{2} \times v_{r\_n} + \kappa_2 \times (H_{Ur\_n} + H_{Dr\_n}) + \kappa_3 \times L_{2Dr\_n} + \kappa_4 \times V_n^2 \times L_{3Dr\_n} \right\} \quad (23)$$

$\kappa_1$, $\kappa_2$, $\kappa_3$ and $\kappa_4$ in expression (23) respectively represent an acceleration resistance coefficient, a grade resistance coefficient, a road surface resistance coefficient and an air resistance coefficient. In addition, C represents a power conversion coefficient, whereas R represents a regeneration coefficient. These coefficients are constants, the values of which are determined based upon the characteristic features of the estimation target vehicle, such as its weight, its shape, its motor characteristics and the switching loss occurring therein, and physical constants including the gravitational acceleration constant. Specific values taken for these coefficients are determined based upon the vehicle type information and the like included in the vehicle information received in step S410. It is to be noted that since the vehicle 100 is designated as the estimation target vehicle in this example, the coefficients $\kappa_1$, $\kappa_2$, $\kappa_3$ and $\kappa_4$ take values that are respectively equal to those of the coefficients $\lambda_1$, $\lambda_2$, $\lambda_3$ and $\lambda_4$ in expression (2) described earlier.

In addition, $V_n$ in expression (23) represents the traveling speed through the particular link. The value taken for this traveling speed $V_n$ can be determined in much the same way as the average vehicle speed $V_{ave}$ in expression (2) mentioned earlier, based upon, for instance, a preselected value set in advance in correspondence to the particular link. As an alternative, a traveling speed for each link may be calculated in advance based upon the statistical loss parameters and the statistical regeneration parameters corresponding to the link and the traveling speed $V_n$ may be set by using the pre-calculated traveling speed.

It is to be noted that $E_n$ calculated as expressed in (23) to take a negative value indicates an estimated power regeneration quantity instead of an estimated power consumption quantity. In other words, $E_n$ taking a negative value indicates that as the vehicle 100 travels through the link, the estimated quantity $E_n$ of regenerated power is obtained through regenerative power generation and that the remaining power in the battery 3 increases with the regenerated power used to charge the battery 3.

In step S450, the estimated power consumption quantity or the estimated power regeneration quantity is calculated for the selected link, as has been described above. It is to be noted that the term "estimated power consumption quantity" may be used in the following description to refer to both the estimated power consumption quantity and the estimated power regeneration quantity.

In step S460, the arithmetic processing unit 501 calculates an estimated total power consumption quantity indicating the quantity of power expected to be consumed by the time the vehicle 100, designated as the estimation target vehicle, reaches the selected link, based upon the estimated power consumption quantity calculated in step S450 and makes a decision as to whether or not the estimated total power consumption quantity is equal to or less than the remaining power available in the vehicle 100. In this step, the estimated total power consumption quantity indicating the quantity of power expected to be consumed by the time the vehicle 100 reaches the currently selected link, is calculated by adding up all the estimated power consumption quantities each having been calculated through a previous session of the processing in step S450 executed for one of the links present between the position of the vehicle 100 and the currently selected link. It is to be noted that links are selected one at a time, i.e., each time step S430 is executed, starting with the link closest to the position of the vehicle 100, as has been explained earlier. This means that by the time the estimated power consumption quantity is calculated in step S450 for a given link having been selected in step S430, estimated power consumption quantities will already have been calculated for all the links present between the position of the vehicle 100 and the particular link. Thus, the estimated total power consumption quantity indicating the quantity of power expected to be consumed by the time the vehicle 100 reaches the link can be calculated by adding up these estimated power consumption quantities, each corresponding to one of the in-between links.

The arithmetic processing unit 501 executes the decision-making in step S460 by comparing the estimated total power consumption quantity indicating the quantity of power expected to be consumed by the time the vehicle 100 reaches the link, having been calculated as described above, with the remaining power indicated in the remaining battery power information included in the vehicle information received in step S410. If the estimated total power consumption quantity indicating the quantity of power expected to be consumed by the time the vehicle 100 reaches the link is equal to or less than the remaining power, the operation returns to step S430 to select a next link and execute the processing described earlier for the newly selected link. If, on the other hand, it is decided that the estimated total power consumption quantity indicating the quantity of power expected to be consumed by the time the vehicle 100 reaches the link is equal to or greater than the remaining power, the operation proceeds to step S470.

In step S470, the arithmetic processing unit 501 sets a reachable range along the link selected in step S430. For instance, the range extending from the position of the vehicle 100 through the link boundary point between the currently selected link and the link adjacent to the currently selected link, which is located further toward the vehicle 100, may be set as the reachable range along the link.

In step S480, the arithmetic processing unit 501 makes a decision as to whether or not reachable ranges have been set for all search directions running relative to the vehicle 100. Namely, a decision is made as to whether or not reachable ranges have been determined in step S470 in correspondence to all the directions in which links can be followed from the position of the vehicle 100 determined in step S420. If the decision-making results indicate that there is a search direction along which a reachable range has not yet been set, the operation returns to step S430, in which a link present along the particular search direction is selected so as to execute the processing discussed above for the selected link. If, on the other hand, reachable ranges have been set for all the search directions, the operation proceeds to step S490.

In step S490, the arithmetic processing unit 501 determines through calculation the shape of a current travel limit area corresponding to the reachable ranges determined in step S470. In this step, the shape of the current travel limit area is determined through calculation by connecting the link boundary points present along the various directions in which the reachable ranges have been set. As a result, a specific current travel limit area for the vehicle 100 designated as the estimation target vehicle can be defined on the map.

In step S500, the arithmetic processing unit 501 transmits current travel limit area information indicating the current travel limit area for the vehicle 100 to the navigation device 1. Namely, information pertaining to the shape of the current travel limit area determined through calculation in step S490 is transmitted as the current travel limit area information to the navigation device 1 via the mobile communication network 400. Such current travel limit area information may include position information indicating the positions of the various vertices of the current travel limit area. Once the processing in step S500 is executed, the processing shown in the flowchart presented in FIG. 10 ends.

As the current travel limit area estimation processing is executed in the server device 500 as described above, the current travel limit area information is transmitted from the server device 500 to the navigation device 1 in response to a request issued from the navigation device 1. Upon receiving the current travel limit area information originating from the server device 500, the navigation device 1 displays the current travel limit area on the map on display at the display monitor 15 based upon the current travel limit area information.

Figure 11:
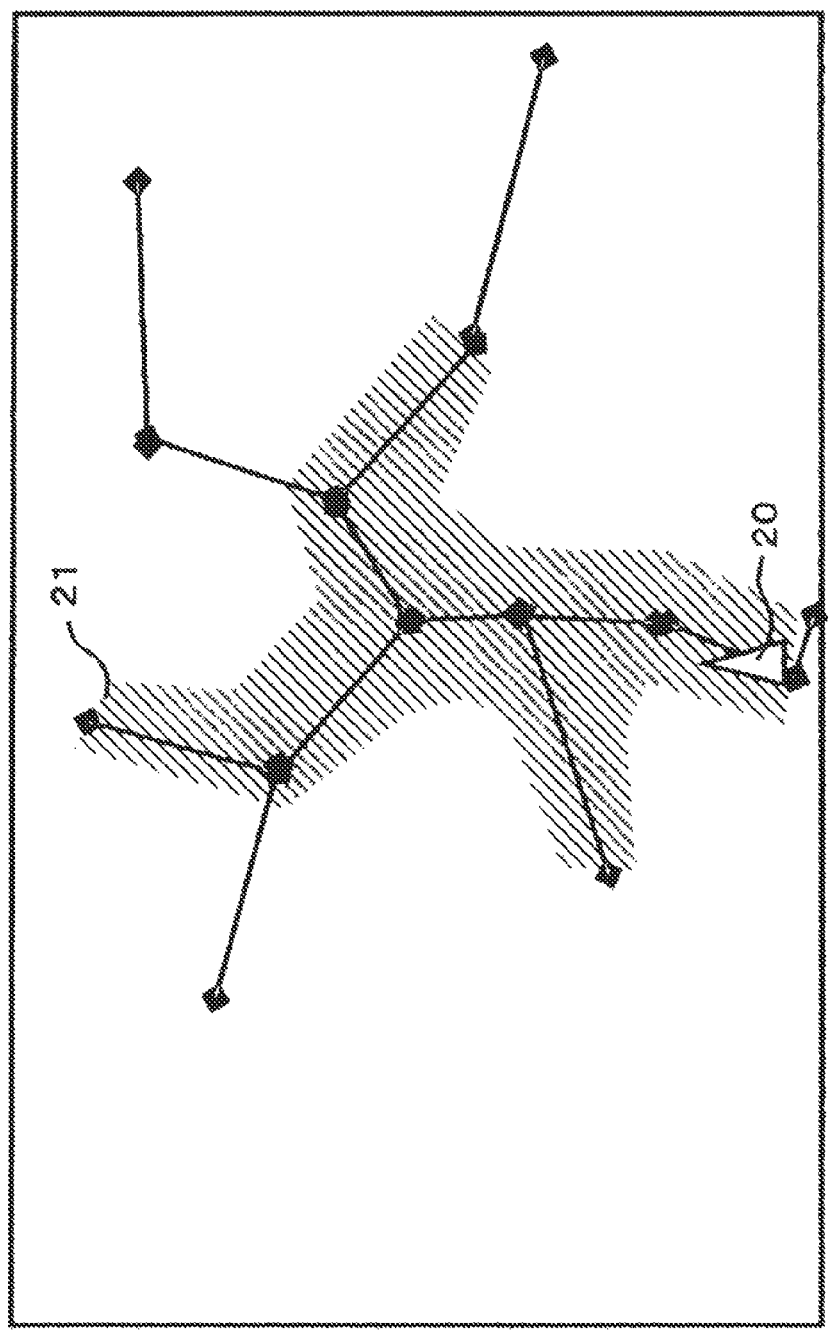
FIG. 11 shows how a current travel limit area may be displayed.

FIG. 11 illustrates how the current travel limit area may be displayed at the display monitor 15. In this example, a vehicle position mark 20 indicating the position of the vehicle 100 and a current travel limit area 21 are superimposed over the map screen on display. Viewing such a current travel limit area 21 displayed at the display monitor 15, the user is able to easily verify the range over which the vehicle 100 will be able to keep traveling with the currently available remaining power.

The following advantages are achieved through the embodiment described above.

(1) The navigation device 1 installed in each of the vehicles 100, 200 and 300 detects an acceleration/deceleration change occurring in the vehicle (step S30) and transmits acceleration/deceleration information pertaining to detected acceleration/deceleration changes to the server device 500 (step S100) through processing executed by the control unit 10. The server device 500, in turn, receives the acceleration/deceleration information transmitted from the navigation device 1 in each vehicle (step S210) and calculates statistical parameter values for each link based upon the acceleration/deceleration information thus received (step S290) through processing executed by the arithmetic processing unit 501. Then, based upon the statistical parameter values calculated as described above, in correspondence to each of the links, an estimated power consumption quantity or an estimated power regeneration quantity, indicating the quantity of power the estimation target vehicle is expected to consume or regenerate as it travels on the road ahead, is calculated (step S450). Through these measures, the level of energy consumption as the vehicle travels on, i.e., the power consumption quantity, can be accurately predicted.

(2) Upon determining in step S30 that the vehicle 100 has shifted from an accelerating state to a decelerating state or from a decelerating state to an accelerating state, the control unit 10 detects an acceleration/deceleration change. Through this process, a change in the acceleration/deceleration can be easily and reliably detected with optimal timing.

(3) The control unit 10 calculates, while taking a position of the vehicle 100 at a time when the acceleration/deceleration change was most recently detected in step S30 and the acceleration/deceleration information was recorded in the following step S80 as an origin point, the actual cumulative traveling distance of the vehicle 100 from the origin point (step S50). If this actual cumulative traveling distance satisfies a predetermined condition, the corresponding position of the vehicle 100 is detected as an equivalent point, which is to be regarded equivalent to an acceleration/deceleration change (step S60). In more specific terms, a hypothetical cumulative traveling distance that would be covered by the vehicle 100 having departed the origin point by continuously traveling at a constant acceleration/deceleration rate is calculated (step S40), and if the difference between this hypothetical cumulative traveling distance and the actual cumulative traveling distance is equal to or greater than a predetermined reference value, an equivalent point is detected in step S60. Through these measures, even when the vehicle does not shift from acceleration to deceleration or from deceleration to acceleration very often and an acceleration/deceleration change is not detected over an extended period of time, acceleration/deceleration information can be recorded by detecting an equivalent point with optimal timing.

(4) The control unit 10 records information indicating the speed of the vehicle 100, the time point and the position assumed by the vehicle 100 when an acceleration/deceleration change is detected in step S30 or when an equivalent point that is regarded equivalent to an acceleration/deceleration change is detected in step S60 into the HDD 14 as acceleration/deceleration information (step S80), and transmits the acceleration/deceleration information to the server device 500 in step S100. Thus, information needed for the processing executed in the server device 500 can be transmitted as the acceleration/deceleration information.

(5) In step S290, the arithmetic processing unit 501 calculates values for the statistical parameters that include statistical loss parameters, corresponding to loss segments through which the vehicle 100 traveling on the particular segments loses energy, and statistical regeneration parameters, corresponding to regeneration segments through which energy is regenerated in the vehicle 100 traveling on the particular segments, in correspondence to each link. Through these measures, the statistical parameters taking values reflecting the actual vehicle traveling conditions can be calculated efficiently.

(6) The server device 500 ascertains the remaining power available in the estimation target vehicle (step S410) based upon the vehicle information received from the particular vehicle and defines a specific current travel limit area on the map (steps S460 through S490) for the vehicle 100 designated as the estimation target vehicle based upon the remaining power and the estimated power consumption quantity or the estimated power regeneration quantity calculated in step S450, through processing executed by the arithmetic processing unit 501. It then outputs the current travel limit area information pertaining to the shape of the current travel limit area thus defined to an outside recipient by transmitting the current travel limit area information to the navigation device 1 (step S500). Thus, information required in the navigation device 1 can be transmitted by reducing the volume of the transmission data, since it does not need to transmit information indicating specific links corresponding to the current travel limit area.

(Variation 1)

It is to be noted that the server device 500 receives the acceleration/deceleration information transmitted from each of the vehicles 100, 200 and 300 and the server device 500 then executes the loss/regeneration parameter calculation processing, as shown in FIG. 6, and the current travel limit area estimation processing, as shown in FIG. 10, in the information system for automotive achieved in the embodiment described above. However, the present invention is not limited to this example and the loss/regeneration parameter calculation processing and the current travel limit area estimation processing may be executed in the navigation device 1 installed in each vehicle instead of delegating the processing to the server device 500. In such a case, the navigation device 1 installed in each vehicle will be able to calculate the statistical parameter values by executing the processing in step S220 through step S310 in FIG. 6 based upon the acceleration/deceleration information recorded in the HDD 14. In addition, the navigation device 1 will be able to estimate the power consumption quantity or the power regeneration quantity indicating the quantity of power expected to be consumed or regenerated by the particular vehicle as it travels ahead on the expected route ahead by executing the processing in steps S420 through S490 in FIG. 10 based upon the statistical parameter values thus calculated and then display a current travel limit area corresponding to the estimated power consumption quantity or the estimated power regeneration quantity on the map at the display monitor 15. As a further alternative, the navigation device 1 may obtain acceleration/deceleration information pertaining to another vehicle through vehicle-to-vehicle communication carried out with the other vehicle.

(Variation 2)

In the embodiment described above, the navigation device 1 detects an acceleration/deceleration change upon deciding in step S30 in FIG. 4 that the vehicle 100 has shifted from an accelerating state to a decelerating state or from a decelerating state to an accelerating state. However, an acceleration/deceleration change may be detected through a method other than this. For instance, instead of calculating the difference between the current average traveling speed and the previous average traveling speed in step S40, an extent of change manifested by the current acceleration/deceleration rate relative to the previous acceleration/deceleration rate may be calculated and the navigation device 1 may detect an acceleration/deceleration change upon determining that the extent of change is equal to or greater than a predetermined value. In this case, an acceleration/deceleration change can be detected at, for instance, an inflection point at which the traveling speed changes drastically, as well as at the time of an acceleration/deceleration changeover.

(Variation 3)

The navigation device 1 in the embodiment described above does not detect any acceleration/deceleration change in step S30 in FIG. 4 as long as the difference between the previous average traveling speed and current average traveling speed is equal to or less than a predetermined change ratio. This change ratio may be altered in correspondence to the number of times an acceleration/deceleration change is detected within a predetermined length of time. In such a case, it is desirable to reduce the change ratio if the number of times an acceleration/deceleration change has been detected is small and to increase the change ratio if the number of times an acceleration/deceleration change has been detected is large. Through these measures, the frequency at which an acceleration/deceleration change is detected can be adjusted to an optimal level in correspondence to the traveling conditions and the like of the vehicle 100.

(Variation 4)

The navigation device 1 in the embodiment described above records the average traveling speed calculated for the vehicle 100 in step S10 as part of the acceleration/deceleration information in step S80 in FIG. 4 and then transmits the acceleration/deceleration information to the server device 500 in step S100. However, the present invention is not limited to this example and another type of information, e.g., information indicating the acceleration/deceleration rate, instead of the average traveling speed, may be transmitted as part of the acceleration/deceleration information. Namely, any information may be transmitted as the acceleration/deceleration information as long as it enables the server device 500 to make an accurate decision pertaining to an acceleration/deceleration change.

(Variation 5)

While the navigation device 1 functions as an on-vehicle device in the embodiment described above, the present invention is not limited to this example and it may be adopted in an on-vehicle device other than a navigation device. In addition, while the estimated power consumption quantity calculated for the road through which the vehicle is expected to travel is utilized when determining a specific current travel limit area for the vehicle in the embodiment described above, the estimated power consumption quantity may be utilized for other purposes. For instance, a search for a recommended route to the destination may be executed based upon the estimated power consumption quantity or a suggestion for a stopover point within the route may be made based upon the estimated power consumption quantity.

(Variation 6)

While the power consumption quantity or the power regeneration quantity for an electric vehicle (EV) is estimated in the embodiment described above, the present invention is not limited to this example and may be adopted in a vehicle other than an EV. For instance, the present invention may be adopted in a hybrid electric vehicle (HEV) driven by using electricity and a fuel such as gasoline, or in a conventional vehicle driven exclusively with a fuel such as gasoline. It is to be noted that when the present invention is adopted in a conventional vehicle without any energy regenerating system such as regenerative braking, an estimated energy consumption quantity should be calculated by setting the regeneration coefficient R in expression (23) to 0.

The embodiment and variations thereof described above may be adopted in any combination to realize a combination of advantages. In addition, the embodiment and variations thereof described above simply represent examples and the present invention is in no way limited to these examples as long as the features characterizing the present invention remain intact.

What is claimed is:

1. An on-vehicle device installed in a vehicle, comprising:
    a processor and associated memory storing a program that, when executed, causes the processor to carry out:
    an acceleration/deceleration change detection processing that detects an acceleration/deceleration change of the vehicle; and
    a transmission processing that transmits acceleration/deceleration information pertaining to the acceleration/deceleration change detected by the acceleration/deceleration change detection processing, wherein the acceleration/deceleration change detection processing:

designates a position of the vehicle at which the acceleration/deceleration change was last detected as an origin point;

calculates a hypothetical cumulative traveling distance of the vehicle when the vehicle hypothetically travels from the origin point to a current position at a constant acceleration/deceleration rate;

calculates an actual cumulative traveling distance of the vehicle from the origin point to the current position; and designates the current position as an equivalent point at which the acceleration/deceleration change is virtually detected if an absolute difference between the hypothetical cumulative traveling distance and the actual cumulative traveling distance is equal to or greater than a predetermined value, and wherein the transmission processing further transmits the acceleration/deceleration information pertaining to the equivalent point designated by the acceleration/deceleration change detection processing.

2. An on-vehicle device according to claim 1, wherein:
the acceleration/deceleration change detection processing detects the acceleration/deceleration change when the vehicle has shifted from an accelerating state to a decelerating state or from a decelerating state to an accelerating state.

3. An on-vehicle device according to claim 1, wherein:
the acceleration/deceleration change detection processing detects the acceleration/deceleration change when an extent of the acceleration/deceleration change is equal to or greater than a predetermined value.

4. An on-vehicle device according to claim 1, wherein:
when a ratio of a difference between a current average traveling speed of the vehicle that is currently calculated and a previous average traveling speed of the vehicle that is previously calculated to the previous average traveling speed is equal to or less than a predetermined ratio, detection of the acceleration/deceleration change by the acceleration/deceleration change detection processing is prohibited; and the predetermined ratio is altered based upon a number of times the acceleration/deceleration change detection processing has detected the acceleration/deceleration change during a predetermined length of time.

5. An on-vehicle device according to claim 1, wherein:
the transmission processing transmits information indicating a speed or an acceleration/deceleration rate of the vehicle, a time point and a position of the vehicle, all measured when the acceleration/deceleration change detection processing detects the acceleration/deceleration change, as the acceleration/deceleration information.

* * * * *